(12) United States Patent
Iwasaki et al.

(10) Patent No.: US 9,154,004 B2
(45) Date of Patent: Oct. 6, 2015

(54) RARE EARTH SINTERED MAGNET AND MOTOR

(75) Inventors: Makoto Iwasaki, Tokyo (JP); Fumitaka Baba, Tokyo (JP); Satoshi Tanaka, Tokyo (JP); Hideki Sasaki, Tokyo (JP); Takahide Kurahashi, Tokyo (JP); Hitoshi Maro, Tokyo (JP); Keiichi Morimoto, Tokyo (JP); Seiichi Endo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 691 days.

(21) Appl. No.: 13/390,016

(22) PCT Filed: Mar. 4, 2011

(86) PCT No.: PCT/JP2011/055067
§ 371 (c)(1),
(2), (4) Date: Feb. 10, 2012

(87) PCT Pub. No.: WO2011/108704
PCT Pub. Date: Sep. 9, 2011

(65) Prior Publication Data
US 2012/0139388 A1   Jun. 7, 2012

(30) Foreign Application Priority Data
Mar. 4, 2010   (JP) ................................. 2010-048287

(51) Int. Cl.
*H02K 15/03* (2006.01)
*H02K 15/12* (2006.01)
(Continued)

(52) U.S. Cl.
CPC .. *H02K 1/02* (2013.01); *B22F 3/24* (2013.01); *B22F 9/023* (2013.01); *B22F 9/04* (2013.01); *C22C 33/0278* (2013.01);
(Continued)

(58) Field of Classification Search
CPC ............ H02K 15/03; H01F 41/02; B22F 1/02
USPC .................. 310/156.01, 44; 29/607; 335/302; 427/127
See application file for complete search history.

(56) References Cited

U.S. PATENT DOCUMENTS

| 7,488,393 | B2 | 2/2009 | Nakamura et al. |
| 7,488,394 | B2 | 2/2009 | Nakamura et al. |

(Continued)

FOREIGN PATENT DOCUMENTS

| CN | 101652822 A | 2/2010 |
| EP | 2133891 A1 * | 12/2009 |

(Continued)

OTHER PUBLICATIONS

May 31, 2011 International Search Report issued in International Patent Application No. PCT/JP2011/055067 (with translation).

*Primary Examiner* — Joshua Benitez-Rosario
*Assistant Examiner* — Jose Gonzalez Quinones
(74) *Attorney, Agent, or Firm* — Oliff PLC

(57) ABSTRACT

In the rare earth sintered magnet, the ratio of R2 to the sum of R1 and R2 that are contained in crystal grain boundaries surrounding the crystal grains in the rare earth sintered magnet body is higher than the ratio of R2 to the sum of R1 and R2 in the crystal grains, and the concentration of R2 increases from the central portion of the rare earth sintered magnet body toward the surface of the rare earth sintered magnet body. In addition, the degree of unevenness in residual magnetic flux density on the surface of the rare earth sintered magnet body is smaller than 3.0%.

9 Claims, 9 Drawing Sheets

(51) Int. Cl.

| | |
|---|---|
| *H02K 15/16* | (2006.01) |
| *H01F 7/02* | (2006.01) |
| *H01F 41/02* | (2006.01) |
| *H02K 1/02* | (2006.01) |
| *B22F 3/24* | (2006.01) |
| *B22F 9/02* | (2006.01) |
| *B22F 9/04* | (2006.01) |
| *C22C 33/02* | (2006.01) |
| *C22C 38/00* | (2006.01) |
| *C22C 38/06* | (2006.01) |
| *C22C 38/10* | (2006.01) |
| *C22C 38/16* | (2006.01) |
| *H01F 1/057* | (2006.01) |

(52) U.S. Cl.
CPC ............ *C22C 38/002* (2013.01); *C22C 38/005* (2013.01); *C22C 38/06* (2013.01); *C22C 38/10* (2013.01); *C22C 38/16* (2013.01); *H01F 1/0577* (2013.01); *H01F 7/02* (2013.01); *H01F 41/0293* (2013.01); *H02K 15/03* (2013.01); *B22F 2999/00* (2013.01)

(56) References Cited

U.S. PATENT DOCUMENTS

| | | | |
|---|---|---|---|
| 7,488,395 | B2 | 2/2009 | Nakamura et al. |
| 7,520,941 | B2 | 4/2009 | Nakamura et al. |
| 2005/0233068 | A1 | 10/2005 | Yoshimura et al. |
| 2007/0034299 | A1 | 2/2007 | Machida et al. |
| 2008/0054736 | A1* | 3/2008 | Miyata et al. ............... 310/44 |
| 2008/0241513 | A1* | 10/2008 | Komuro et al. ............ 428/328 |
| 2008/0247898 | A1 | 10/2008 | Nakamura et al. |
| 2008/0257716 | A1 | 10/2008 | Nagata et al. |
| 2009/0224615 | A1* | 9/2009 | Komuro et al. ............... 310/46 |
| 2009/0297699 | A1 | 12/2009 | Baba et al. |
| 2010/0079025 | A1* | 4/2010 | Suzuki et al. ........... 310/156.11 |
| 2011/0012699 | A1 | 1/2011 | Odaka et al. |

FOREIGN PATENT DOCUMENTS

| | | | |
|---|---|---|---|
| GB | 1347764 A * | 2/1974 | |
| JP | A-2005-011973 | 1/2005 | |
| JP | 2005109421 A * | 4/2005 | |
| JP | A-2005-109421 | 4/2005 | |
| JP | A-2005-175138 | 6/2005 | |
| JP | A-2006-281063 | 10/2006 | |
| JP | 2006303433 A * | 11/2006 | |
| JP | A-2006-303433 | 11/2006 | |
| JP | A-2006-303434 | 11/2006 | |
| JP | A-2006-303435 | 11/2006 | |
| JP | A-2006-303436 | 11/2006 | |
| JP | 2008147634 A * | 6/2008 | |
| JP | A-2008-147634 | 6/2008 | |
| JP | A-2008-270699 | 11/2008 | |
| JP | A-2009-183069 | 8/2009 | |
| JP | A-2009-200180 | 9/2009 | |
| JP | A-2009-289994 | 12/2009 | |
| WO | WO 2006/100968 A1 | 9/2006 | |

* cited by examiner

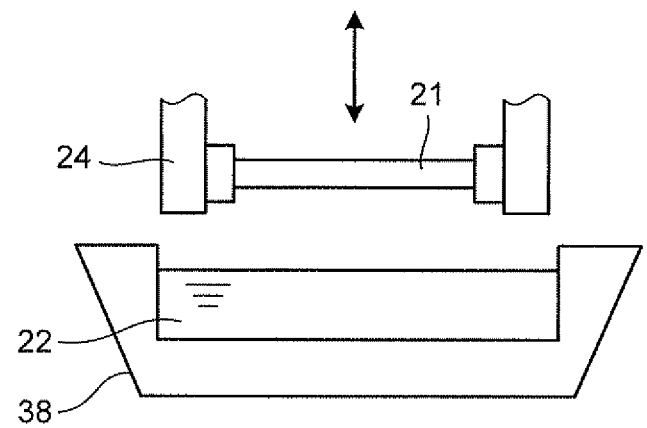
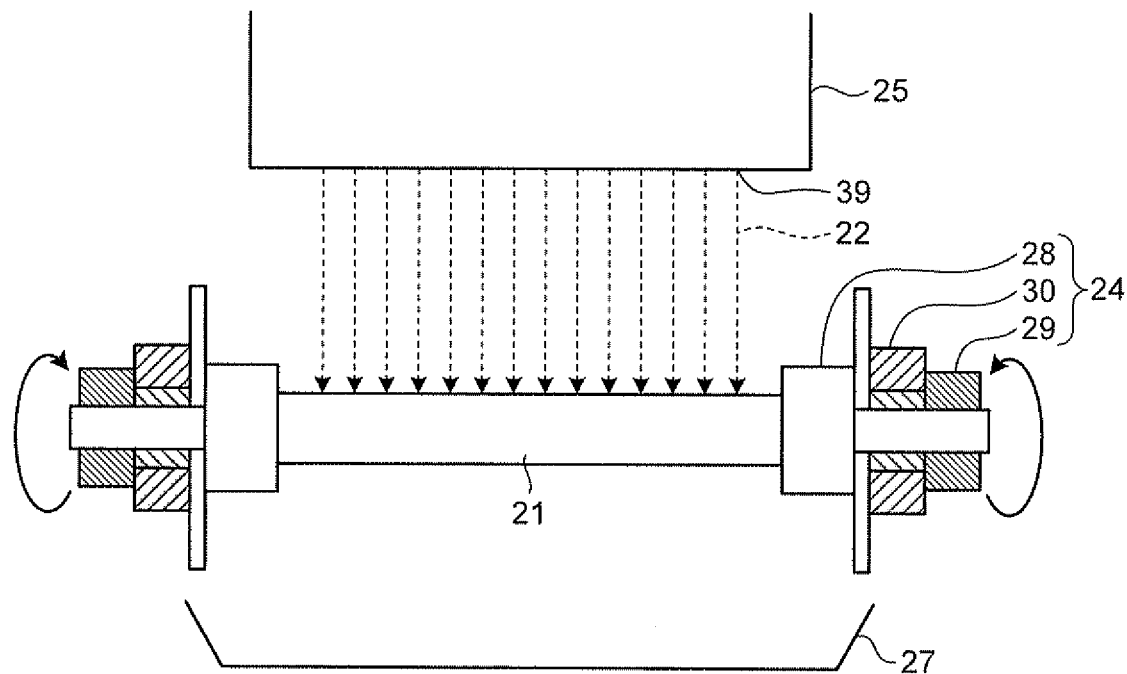

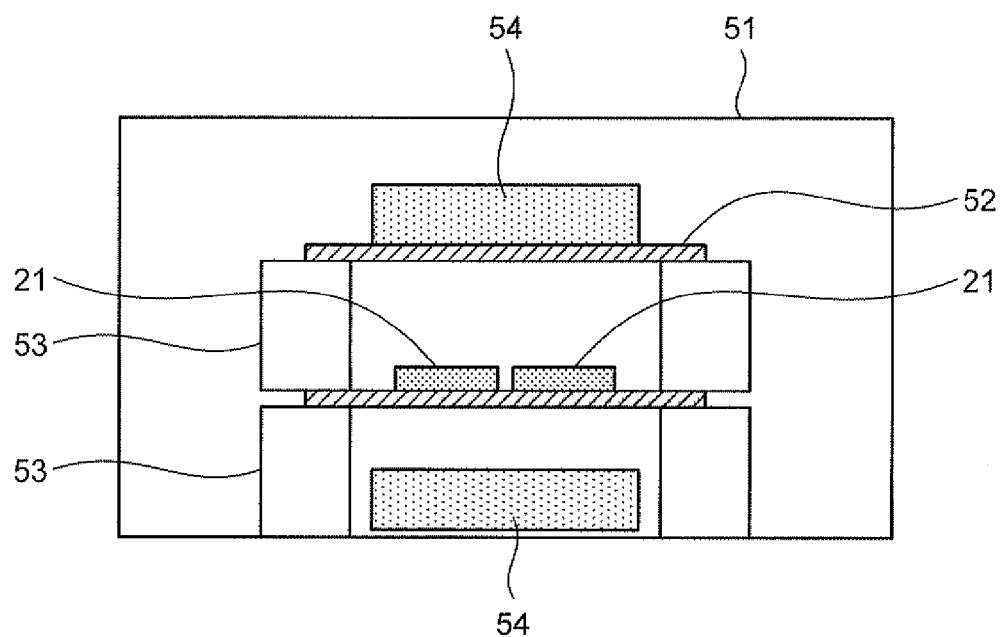

RARE EARTH SINTERED MAGNET AND MOTOR

FIELD

The present invention relates to a rare earth sintered magnet obtained by adhering a rare earth compound to a rare earth sintered magnet body and subjecting the resultant magnet body to heat treatment. The invention also relates to a motor.

BACKGROUND

A rare earth sintered magnet with a composition of R—Fe—B (R is a rare earth element) has excellent magnetic properties. One method for producing such a rare earth magnet includes applying (adhering) a slurry containing rare earths to a sintered body and then subjecting the resultant sintered body to heat treatment. For example, Patent Literature 1 discloses a method for producing a rare earth permanent magnet. The method is characterized in that, with a powder containing a rare earth element including Y and Sc being present on the surface of a rare earth sintered magnet body, the rare earth sintered magnet body and the powder are subjected to heat treatment at a temperature lower than the sintering temperature of the rare earth sintered magnet body in a vacuum or in an inert gas for 1 minute to 100 hours, so that the rare earth element(s) contained in the powder is(are) absorbed into the rare earth sintered magnet body. Patent Literature 1 also describes, as a method for adhering the powder containing the rare earth element to the rare earth sintered magnet body, a method for putting the rare earth sintered magnet body into a slurry obtained by dispersing the powder in water or an organic solvent.

CITATION LIST

Patent Literature

Patent Literature 1: Japanese Patent Application Laid-Open No 2008-147634

SUMMARY

Technical Problem

However, in the method for putting the sintered body into the slurry obtained by dispersing the powder in water or an organic solvent, the thickness of the applied slurry may vary depending on the position on the surface of the sintered body, i.e., may be uneven. Such unevenness in the amount of the adhered slurry (the amount of the adhered rare earth compound) may cause a problem in that the magnetic flux on the surface of a magnet produced by subsequent heat treatment becomes uneven and therefore its magnetic properties such as a residual magnetic flux density Br become uneven.

The present invention has been made in view of the above, and it is an object to provide a rare earth sintered magnet with reduced unevenness in magnetic properties.

Solution to Problem

According to one aspect of the present invention, there is provided a rare earth sintered magnet including a rare earth sintered magnet body including crystal grains of $(R1, R2)_2T_{14}B$ (wherein R1 represents at least one rare earth element except for Dy and Tb, R2 represents a rare earth element at least including one or both of Dy and Tb, and T represents one or more transition metal elements including Fe or including Fe and Co), wherein: a ratio of R2 to a sum of R1 and R2 that are contained in crystal grain boundaries surrounding the crystal grains in the rare earth sintered magnet body is higher than a ratio of R2 to a sum of R1 and R2 in the crystal grains, and a concentration of R2 increases from a central portion of the rare earth sintered magnet body toward a surface of the rare earth sintered magnet body; and a degree of unevenness in residual magnetic flux density on the surface of the rare earth sintered magnet body is smaller than 3.0%.

The rare earth sintered magnet body including crystal grains of $(R1, R2)_2T_{14}B$ and a slurry containing a compound of the rare earth element R2 are subjected to heat treatment with the slurry being present on the surface of the rare earth sintered magnet body, so that the compound of the rare earth element R2 contained in the slurry is absorbed. With this treatment, the compound of the rare earth element R2 contained in the slurry present on the surface of the rare earth sintered magnet body is allowed to enter the interior of the rare earth sintered magnet body through the crystal grain boundaries (the boundaries between the crystal grains) and then diffuses into the crystal grains from the grain boundaries. In the present invention, the ratio of R2 to the sum of R1 and R2 that are contained in the crystal grain boundaries surrounding the crystal grains of $(R1, R2)_2T_{14}B$ in the rare earth sintered magnet body is higher than the ratio of R2 to the sum of R1 and R2 in the crystal grains. The R-rich layer in the grain boundaries is liquefied when heated, and therefore the rate of diffusion of R2 along the crystal grain boundaries is considered to be higher than the rate of diffusion from the grain boundaries to the interior of the crystal grains. The heat treatment temperature used in the heat treatment is set to be lower than the sintering temperature of the rare earth sintered magnet body. Therefore, the compound of the rare earth element R2 diffuses mainly along the crystal grain boundaries of the rare earth sintered magnet body and does not diffuse deep into the crystal grains. By utilizing the difference in diffusion rate and controlling the heat treatment temperature to a temperature lower than the sintering temperature of the rare earth sintered magnet body, R2 diffuses into the vicinities of the grain boundaries of the crystal grains of the rare earth sintered magnet body. In the present invention, the compound of the rare earth element R2 is applied to the surface of the rare earth sintered magnet body to supply the compound thereto. Therefore, a larger amount of R2 is distributed on the surface side of the rare earth sintered magnet body than in its interior. More specifically, R2 is distributed such that its concentration increases from the central portion of the rare earth sintered magnet body toward the surface thereof.

The compound of the rare earth element R2 is allowed to enter the interior of the rare earth sintered magnet body from the surface thereof through the crystal grain boundaries and then diffuse into the crystal grains from the crystal grain boundaries, and the diffused R2 is diffused near the grain boundaries of the crystal grains. Therefore, in the rare earth sintered magnet of the present invention, the ratio of R2 to the sum of R1 and R2 that are contained in the crystal grain boundaries in the rare earth sintered magnet body is higher than the ratio of R2 to the sum of R1 and R2 in the crystal grains. Accordingly, in the rare earth sintered magnet of the present invention, the coercive force HcJ of the magnet can be increased with little reduction in residual magnetic flux density Br.

The degree of unevenness in residual magnetic flux density Br on the surface of the rare earth sintered magnet body is smaller than 3.0%. Accordingly, in the rare earth sintered magnet having been subjected to heat treatment, unevenness in magnetic flux on its surface can be reduced, and unevenness in magnetic properties such as residual magnetic flux density Br can thereby be reduced. Therefore, when the rare earth sintered magnet of the present invention is used as a permanent magnet for a motor, the cogging torque of the motor can be reduced.

In the present invention, it is preferable that the degree of unevenness in coercive force HcJ on the surface of the rare earth sintered magnet body is preferably lower than 18.0%. By reducing the unevenness in the coercive force HcJ on the surface of the rare earth sintered magnet body, the demagnetization temperature of the rare earth sintered magnet at which demagnetization starts can be increased. Therefore, when the rare earth sintered magnet is used as a permanent magnet for a motor, the heat resistance of the permanent magnet can be improved.

In the present invention, it is preferable that the rare earth sintered magnet body has a plurality of faces, and among the plurality of faces of the rare earth sintered magnet body, a face on which the degree of unevenness in residual magnetic flux density is minimum is perpendicular to an alignment direction of the rare earth sintered magnet body. When a motor is caused to rotate, the magnetic flux in the alignment direction of the rare earth sintered magnet is used. If the magnetic flux of the rare earth sintered magnet is uneven, it is difficult to rotate the motor appropriately. When, among the faces of the rare earth sintered magnet body, a face on which the degree of unevenness in residual magnetic flux density Br is smaller than those of other faces is configured to be perpendicular to the alignment direction of the rare earth sintered magnet body, the degree of unevenness in magnetic flux becomes small. Therefore, the rare earth sintered magnet of the present invention can improve the performance of a motor such as its torque characteristics and can therefore be favorably used as a permanent magnet for a motor.

According to another aspect of the present invention, there is provided a rare earth sintered magnet obtained by rotating a rare earth sintered magnet body including crystal grains of $(R1, R2)_2T_{14}B$ (wherein R1 represents at least one rare earth element except for Dy and Tb, R2 represents a rare earth element at least including one or both of Dy and Tb, and T represents one or more transition metal elements including Fe or including Fe and Co), applying a slurry containing a compound of the rare earth element R2 to the rare earth sintered magnet body, drying the slurry while the rare earth sintered magnet body is rotated, and subjecting the rare earth sintered magnet body including the dried slurry to heat treatment, wherein: a ratio of R2 to a sum of R1 and R2 that are contained in crystal grain boundaries surrounding the crystal grains in the rare earth sintered magnet body is higher than a ratio of R2 to a sum of R1 and R2 in the crystal grains, and a concentration of R2 increases from a central portion of the rare earth sintered magnet body toward a surface of the rare earth sintered magnet body; and a degree of unevenness in residual magnetic flux density on the surface of the rare earth sintered magnet body is smaller than 3.0%.

By supplying the slurry containing the compound of the rare earth element R2 to the rare earth sintered magnet body while the rare earth sintered magnet body is rotated, the slurry can be applied to the entire rare earth sintered magnet body without unevenness.

In this rare earth sintered magnet of the present invention, as in the above-described sintered magnet, the compound of the rare earth element R2 is allowed to enter the interior of the rare earth sintered magnet body from the surface thereof through the crystal grain boundaries. Then the compound of the rare earth element R2 is allowed to diffuse into the crystal grains from the crystal grain boundaries, and the diffused R2 is distributed near the grain boundaries of the crystal grains. Therefore, in the rare earth sintered magnet of the present invention, the coercive force HcJ of the magnet can be increased with little reduction in residual magnetic flux density Br. In addition, the degree of unevenness in residual magnetic flux density Br on the surface of the rare earth sintered magnet body is less than 3.0%. Accordingly, in the rare earth sintered magnet produced by heat treatment in the manner described above, unevenness in magnetic flux on its surface can be reduced, and unevenness in magnetic properties such as residual magnetic flux density Br can thereby be reduced. Therefore, when the rare earth sintered magnet of the present invention is used as a permanent magnet for a motor, the cogging torque of the motor can be reduced.

In the rare earth sintered magnet body, after the slurry is applied to the rare earth sintered magnet body, the applied slurry is dried. Therefore, the occurrence of unevenness in the thickness of the applied slurry can be more reliably suppressed.

It is preferable that the slurry is sprayed onto the rare earth sintered magnet body to be applied to the rare earth sintered magnet body. In this manner, the slurry can be more uniformly applied to the entire axial area of the rare earth sintered magnet body.

It is preferable that the rare earth sintered magnet body is immersed in a region in which the slurry is stored to thereby apply the slurry to the rare earth sintered magnet body. In this manner, the slurry can be more easily and uniformly applied to the entire area of the rare earth sintered magnet body.

It is preferable that the slurry is applied as a plurality of slurry streams to the rare earth sintered magnet body. In this manner, the slurry can be uniformly applied to the entire axial area of the rare earth sintered magnet body.

It is preferable that the slurry is dropped from a position vertically above a placement position of the rare earth sintered magnet body to be applied to the rare earth sintered magnet body. Since the slurry is dropped from a position vertically above the placement position of the rare earth sintered magnet body so as to be applied to the rare earth sintered magnet body, the slurry can be more easily and uniformly applied to the entire axial area of the rare earth sintered magnet body.

According to still another aspect of the present invention, there is provided a motor including a stator including a plurality of coils arranged circumferentially, and a rotor disposed rotatably in the stator and including rare earth sintered magnets according to any one of claims 1 to 8, the rare earth sintered magnets being disposed on an outer circumferential surface of the rotor at predetermined intervals. In the motor of the present invention, the rare earth sintered magnets with reduced unevenness in their magnetic properties are used as permanent magnets. Therefore, the cogging torque and torque ripple can be reduced, and the performance of the motor can thereby be improved.

Advantageous Effects of Invention

The present invention can provide a rare earth sintered magnet with reduced unevenness in magnetic properties. By using the rare earth sintered magnet for a motor, the performance of the mother can be improved.

BRIEF DESCRIPTION OF DRAWINGS

FIG. 6 is a diagram simply illustrating another structure used to apply a slurry to the rare earth sintered magnet body.

FIG. 7 is a schematic diagram illustrating another structure used to apply the slurry to the rare earth sintered magnet body.

FIG. 10 is a diagram illustrating an example of a processing container used to evaporate $DyH_2$ onto the surface of the rare earth sintered magnet body and diffuse the $DyH_2$ over the surface.

FIG. 11 is a diagram illustrating respective regions of a sintered body.

DESCRIPTION OF EMBODIMENTS

Figure 1:
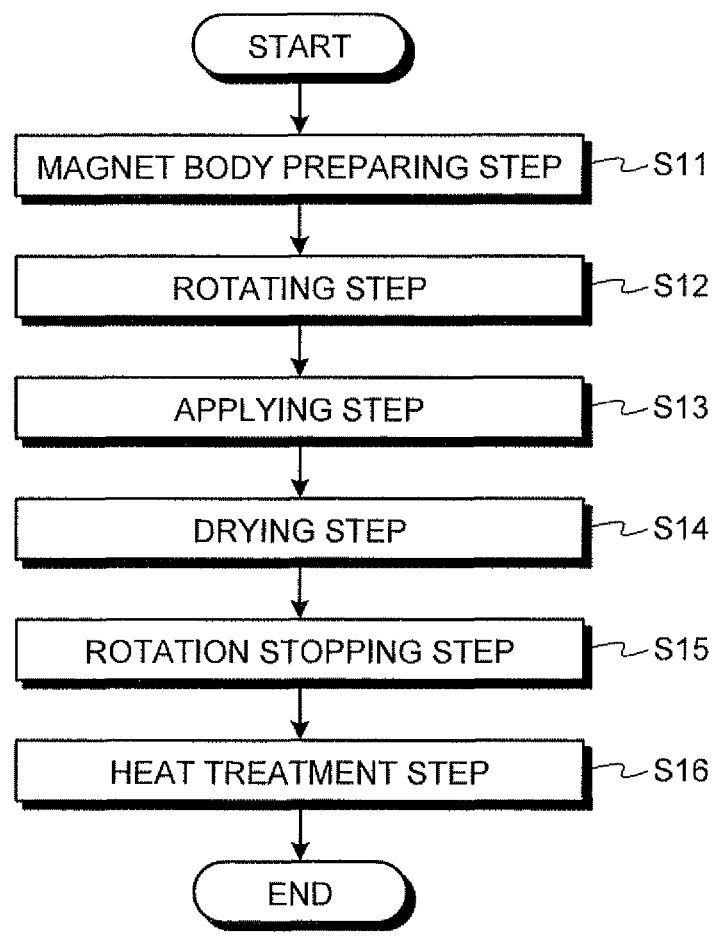
FIG. 1 is a flowchart showing a method for producing a rare earth sintered magnet according to an embodiment of the present invention.

The present invention will next be described in detail with reference to the drawings. However, the present invention is not limited to the following modes for carrying out the invention (which will be referred to as embodiments). The components in the following embodiments include those easily contemplated by a person skilled in the art and those substantially similar thereto, i.e., those equivalent thereto. The components disclosed in the following embodiments can be appropriately combined with each other.

Embodiments

Rare Earth Sintered Magnet

A rare earth sintered magnet according to the present embodiment will be described. The rare earth sintered magnet according to the present embodiment has a rare earth sintered magnet body including crystal grains of $(R1, R2)_2T_{14}B$ (wherein R1 represents at least one rare earth element except for Dy and Tb, R2 represents a rare earth element at least including one or both of Dy and Tb, and T represents one or more transition metal elements including Fe or including Fe and Co). In the rare earth sintered magnet according to the present embodiment, the ratio of R2 to the sum of R1 and R2 that are contained in the crystal grain boundaries surrounding the crystal grains in the rare earth sintered magnet body is higher than the ratio of R2 to the sum of R1 and R2 in the crystal grains, and the concentration of R2 increases from the central portion of the rare earth sintered magnet body toward the surface of the rare earth sintered magnet body.

In the present specification, the composition of crystal grains included in the primary phase of the R-T-B-based rare earth sintered magnet is represented by a composition formula of $(R1, R2)_2T_{14}B$. The primary phase has a tetragonal crystal structure of an $(R1, R2)_2T_{14}B$ type. Therefore, R in the composition of the primary phase of the R-T-B-based rare earth sintered magnet is a generic term for R1 and R2. R includes at least one rare earth element. R1 represents at least one rare earth element except for Dy and Tb, and R2 represents a rare earth element at least including one or both of Dy and Tb. T represents one or more transition metal elements including Fe or including Fe and Co.

In the present embodiment, the term "rare earth sintered magnet" is used to include a magnet product produced by processing and magnetizing the magnet and a non-magnetized product. The crystal grain boundaries may include a rare-earth-rich phase in which the amount of a rare earth element is high and a boron-rich layer in which the amount of boron (B) atoms is high. The diameter of the crystal grains is generally 1 μm to 30 μm.

The rare earth sintered magnet according to the present embodiment utilizes a rare earth sintered magnet body that has been subjected to heat treatment together with a slurry containing a compound of the rare earth element R2 with the slurry being present on the surface of the rare earth sintered magnet body so that the compound of the rare earth element R2 contained in the slurry is absorbed in the rare earth sintered magnet body. In such a rare earth sintered magnet body, the compound of the rare earth element R2 contained in the slurry present on the surface of the rare earth sintered magnet body is allowed to enter the interior of the rare earth sintered magnet body through the crystal grain boundaries and then diffuses into each of the primary phase crystal grains from the grain boundaries. The R-rich layer in the grain boundaries is liquefied when heated, and therefore the rate of diffusion of R2 in the crystal grain boundaries is considered to be higher than the rate of diffusion from the grain boundaries to the interior of the crystal grains. By utilizing the difference in diffusion rate and controlling the heat treatment temperature to a temperature lower than the sintering temperature of the rare earth sintered magnet body, R2 diffuses into the vicinities of the grain boundaries of the crystal grains of the rare earth sintered magnet body. Therefore, the ratio of R2 to the sum of R1 and R2 that are contained in the crystal grain boundaries is higher than the ratio of R2 to the sum of R1 and R2 in the crystal grains. The compound of the rare earth element R2 is applied to the surface of the rare earth sintered magnet body and is then supplied to the interior thereof. Therefore, a larger amount of R2 is distributed on the surface side of the rare earth sintered magnet body than in its interior. Accordingly, the concentration of R2 increases from the central portion of the rare earth sintered magnet body toward the surface of the rare earth sintered magnet body.

In the rare earth sintered magnet according to the present embodiment, the compound of the rare earth element R2 is allowed to enter the interior of the rare earth sintered magnet body from the surface thereof through the crystal grain boundaries. Then the compound of the rare earth element R2 is allowed to diffuse into the crystal grains from the crystal grain boundaries, and the diffused R2 is distributed near the grain boundaries of the crystal grains. Therefore, in the rare earth sintered magnet according to the present embodiment, the coercive force HcJ can be further improved with little decrease in residual magnetic flux density Br, as compared to that when R2 is added using an alloy.

The heat treatment used to allow the compound of the rare earth element R2 contained in the slurry to be absorbed into the rare earth sintered magnet body is performed in a vacuum or in an inert gas atmosphere such as an argon (Ar) or helium (He) atmosphere. When the processing chamber is in an atmosphere at around atmospheric pressure, the compound of the rare earth element R2 contained in the slurry is less likely to enter the interior of the rare earth sintered magnet body. By evacuating the processing chamber to a vacuum or replacing the atmosphere in the processing chamber with an inert gas and reducing the pressure there inside to a pressure lower than the atmospheric pressure when the compound of the rare earth element R2 contained in the slurry is caused to be absorbed into the rare earth sintered magnet body, the compound of the rare earth element R2 is more easily supplied from the surface of the sintered magnet body to the interior thereof. In this manner, the coercive force HcJ of the rare earth sintered magnet can be improved.

The heat treatment temperature used for the heat treatment is set to a temperature lower than the sintering temperature of the rare earth sintered magnet body. This is because when the heat treatment is performed at a temperature equal to or higher than the sintering temperature of the rare earth sintered magnet body, the structure of the rare earth sintered magnet may be changed. In addition, when doing so, the compound of the rare earth element R2 may diffuse not only in the crystal grain boundaries of the rare earth sintered magnet body but also into the interior of the crystal grains, so that the residual magnetic flux density Br on the surface of the rare earth sintered magnet body may decrease.

In the present embodiment, the degree of unevenness in residual magnetic flux density Br on a face of the rare earth sintered magnet body that is perpendicular to its alignment direction is lower than 3.0%, preferably 2.5% or lower, and more preferably 2.0%. This is because, if the degree of unevenness in residual magnetic flux density Br on the face of the rare earth sintered magnet body that is perpendicular to its alignment direction is equal to or larger than 3.0%, the degree of unevenness in magnetic flux on the face of the rare earth sintered magnet produced by heat treatment becomes high. When such a rare earth sintered magnet is used for a motor, its cogging torque cannot be reduced. The degree of unevenness in residual magnetic flux density Br is measured as follows. Test pieces are taken from a plurality of areas on a face of the rare earth sintered magnet body, and a residual magnetic flux density Br of each test piece is measured. The average value of the measured residual magnetic flux densities Br of all the test pieces is determined. Then the difference between the measured residual magnetic flux density Br of each test piece and the average value is divided by the average value and then multiplied by 100, and the resultant value is used as the degree of unevenness in residual magnetic flux density Br. In the measurement of the residual magnetic flux density Br, each of the test pieces taken from the face of the rare earth sintered magnet body is attached to an acrylic rod, and then the residual magnetic flux density Br is measured using a vibrating sample magnetometer (VSM).

In a conventional method in which a sintered body is put into a slurry obtained by dispersing a powder of a compound of a rare earth element R2 in water or an organic solvent, the thickness of the applied slurry may vary depending on the position on the surface of the sintered body, i.e., may be uneven. Therefore, the degree of unevenness in residual magnetic flux density Br on a face of the produced magnet that is perpendicular to its alignment direction is also high. However, in the present embodiment, the slurry containing the compound of the rare earth element R2 is applied to the surface of the rare earth sintered magnet body while the magnet body is rotated, as described later. This can reduce the degree of unevenness in thickness of the slurry applied to the surface of the rare earth sintered magnet body. Therefore, the degree of unevenness in residual magnetic flux density Br on a face of the rare earth sintered magnet body that is perpendicular to its alignment direction can fall within the above range. The degree of unevenness in magnetic properties of the magnet can thereby be further reduced. Therefore, when the rare earth sintered magnet according to the present embodiment is used as, for example, a permanent magnet of a motor, the cogging torque of the motor can be reduced.

If the thickness of the slurry applied to the surface of the rare earth sintered magnet body varies in a plane direction of the rare earth sintered magnet body, the amount of the compound of the rare earth element R2 diffusing in the rare earth sintered magnet body varies in the plane direction of the rare earth sintered magnet body, and therefore the coercive force HcJ varies on the surface of the rare earth sintered magnet body. By reducing the degree of unevenness in thickness of the slurry applied to the surface of the rare earth sintered magnet body, the degree of unevenness in the amount of the compound of the rare earth element R2 diffusing in the rare earth sintered magnet body in a plane direction thereof is reduced. Accordingly, the degree of unevenness in coercive force HcJ on the surface of the rare earth sintered magnet body can be reduced. The degree of unevenness in coercive force HcJ on the surface of the rare earth sintered magnet body is preferably lower than 18.0%, more preferably 15% or lower, and still more preferably 10% or lower. This is because, if the degree of unevenness in coercive force HcJ on the surface of the rare earth sintered magnet body is 18.0% or higher, sufficient heat resistance cannot be imparted thereto when the rare earth sintered magnet produced by heat treatment is used as a magnet for a motor. More specifically, by allowing the degree of unevenness in coercive force HcJ on the surface of the rare earth sintered magnet body to fall within the above range, the demagnetization temperature of the rare earth sintered magnet at which demagnetization starts can be increased. Accordingly, when the rare earth sintered magnet according to the present embodiment is used as, for example, a permanent magnet for a motor, the heat resistance of the permanent magnet can be improved. The degree of unevenness in the coercive force HcJ is measured as follows. Test pieces are taken from a plurality of areas in a face of the rare earth sintered magnet body, and the coercive force HcJ of each test piece is measured. Then the average value of the measured coercive forces HcJ of the test pieces is determined. The difference between the measured coercive force HcJ of each test piece and the average value is divided by the average value and then multiplied by 100. The resultant value is used as the degree of unevenness in coercive force HcJ. The coercive force HcJ is measured by a pulse BH tracer.

As described above, R includes at least one rare earth element. The rare earth elements are Sc, Y, and lanthanoids in Group 3 of the long form periodic table. Examples of the lanthanoids include La, Ce, Pr, Nd, Sm, Eu, Gd, Tb, Dy, Ho, Er, Tm, Yb, and Lu. The rare earth elements are classified into light rare earth elements and heavy rare earth elements. The heavy rare earth elements are Gd, Tb, Dy, Ho, Er, Tm, Yb, and Lu, and the light rare earth elements are the other rare earth elements. From the viewpoint of magnetic properties, it is preferable that R1 include one or both of Nd and Pr as a main component. R2 includes preferably a heavy rare earth element and particularly preferably one or both of Dy and Tb. R2 may further include Ho. In the above case, since the heavy rare earth elements have the effect of increasing the anisotropic magnetic field of the rare earth sintered magnet, the coercive force of the magnet can be improved.

The T described above may further include at least one element other than the rare earth elements, e.g., at least one element selected from the group consisting of transition elements, other than Fe, of Co, Ti, V, Cr, Mn, Ni, Cu, Zr, Nb, Mo, Hf, Ta, W, and the like.

The T may include only Fe, or part of Fe may be replaced with Co. When part of Fe is replaced with Co, temperature characteristics can be improved without any reduction in magnetic properties. Preferably, the amount of Co is not exceeding 20 percent by mass based on the amount of Fe. This is because when part of Fe is replaced with Co such that the amount of Co is higher than 20 percent by mass based on the amount of Fe, the magnetic properties may deteriorate. In addition, the cost may increase.

In the rare earth sintered magnet body described above, part of B may be replaced with carbon (C). In this case, a magnet can be easily produced, and a reduction in the production cost can be achieved. C has corrosion resistance. Therefore, by replacing part of B with C, corrosion resistance can be improved. The amount of C replacing B is set such that the magnetic properties are not substantially affected.

From the viewpoint of improving the coercive force and reducing the production cost, the rare earth sintered magnet according to the present embodiment may further contain, in addition to the above elements, an element such as Al, Bi, Sb, Ge, Sn, Si, Ga, or Zr. Preferably, the amount of such an element is set such that the magnetic properties are not affected. The amount of each element is preferably 5 percent by mass or lower. In addition, oxygen (O), nitrogen (N), C, Ca, etc. may be contained as unavoidable components. Each of such elements may be contained in an amount of about 0.5 percent by mass or lower.

The amount of the rare earth element(s) contained in the rare earth sintered magnet is 25 percent by mass or higher and 35 percent by mass or lower, and preferably 28 percent by mass or higher and 33 percent by mass or lower. The amount of B is 0.5 percent by mass or higher and 1.5 percent by mass or lower, and preferably 0.8 percent by mass or higher and 1.2 percent by mass or lower. When part of Fe is replaced with Co to include Co, the amount of Co is preferably in the range of 4 percent by mass or lower, more preferably 0.1 percent by mass or higher and 2 percent by mass or lower, and still more preferably 0.3 percent by mass or higher and 1.5 percent by mass or lower.

One or both of Al and Cu may be added in the range of 0.02 percent by mass or higher to 0.6 percent by mass or lower. When one or both of Al and Cu are added in the above range, the coercive force and corrosion resistance of the magnet obtained can be increased, and its temperature characteristics can be improved. The amount of Al is preferably 0.03 percent by mass or higher and 0.4 percent by mass or lower, and more preferably 0.05 percent by mass or higher and 0.25 percent by mass or lower. The amount of Cu is preferably 0.3 percent by mass or lower (except for 0), more preferably 0.2 percent by mass or lower (except for 0), and still more preferably 0.03 percent by mass or higher and 0.15 percent by mass or lower.

In the rare earth sintered magnet, the amount of oxygen is preferably 6,000 ppm or lower from the viewpoint of magnetic properties, more preferably 3,000 ppm or lower, and particularly preferably 2,000 ppm or lower. The amount of carbon is preferably 2,000 ppm or lower, more preferably 1,500 ppm or lower, and particularly preferably 1,200 ppm or lower. The amount of nitrogen is preferably 1,000 ppm or lower, more preferably 800 ppm or lower, and particularly preferably 600 ppm or lower.

A rare earth element R2 (R2 represents a rare earth element including one or both of Dy and Tb) or a rare earth compound thereof is suitably used as the compound of the rare earth element R2 added to the slurry and applied to the rare earth sintered magnet body. Examples of the compound of the rare earth element R2 include R2 hydrides, R2 oxides, R2 fluorides, R2T alloys (T represents one or more transition metal elements including Fe or including Fe and Co), R2T hydrides, R2T oxides, R2TB alloys, R2TB hydrides, and R2TB oxides.

Preferably, the slurry contains a resin. In this case, the adhesion of the compound of the rare earth element R2 to the rare earth sintered magnet body can be improved. No particular limitation is imposed on the resin used, and any of polyurethane resin, polyester resin, butyral resin, acrylic resin, phenol resin, epoxy resin, cellulose resin, etc. is used. No particular limitation is imposed on a solvent used to dissolve the resin, so long as it can dissolve the resin.

The rare earth sintered magnet body is molded into any desired shape by, for example, press molding. No particular limitation is imposed on the shape of the rare earth sintered magnet body. The rare earth sintered magnet body can be molded into any desired shape, such as a flat plate shape, a columnar shape, and a cylindrical shape in which the rare earth sintered magnet body has a C-shaped cross-section, depending of the shape of the mold used.

When the rare earth sintered magnet body has a flat plate shape, it may be formed such that a flat face having the largest area is perpendicular to the alignment direction of the rare earth sintered magnet body. In this case, the faces of the rare earth sintered magnet body are formed such that the degree of unevenness in residual magnetic flux density Br is smallest on the flat face having the largest area. When the surface having the largest area is configured to be perpendicular to the alignment direction of the rare earth sintered magnet body, the degree of unevenness in magnetic flux can be reduced. When the rare earth sintered magnet body has a quadrangular prism shape, it may be formed such that a pair of side faces of the rare earth sintered magnet body are perpendicular to the alignment direction of the rare earth sintered magnet body. In this case, the faces of the rare earth sintered magnet body are formed such that the degree of unevenness in residual magnetic flux density Br is smallest on the pair of side faces of the rare earth sintered magnet body. When the pair of side faces of the rare earth sintered magnet body are configured to be perpendicular to the alignment direction of the rare earth sintered magnet body, the degree of unevenness in magnetic flux can be reduced.

<Method for Producing Rare Earth Sintered Magnet>

A preferred method for producing the rare earth sintered magnet having the configuration described above will be described with reference to the drawings. FIG. 1 is a flowchart showing the method for producing the rare earth sintered magnet according to the embodiment of the present invention. As shown in FIG. 1, the method for producing the rare earth sintered magnet according to the present embodiment includes the following steps:

a magnet body preparing step of supplying a rare earth sintered magnet body containing crystal grains of $(R1, R2)_2T_{14}B$ (step S11);

a rotating step of rotating the rare earth sintered magnet body (step S12);

an applying step of applying a slurry containing a compound of a rare earth element R2 to the rare earth sintered magnet body (step S13);

a drying step of drying the rotating rare earth sintered magnet body to which the slurry is applied (step S14);

a rotation stopping step of stopping the rotation of the rare earth sintered magnet body (step S15); and a heat treatment step of subjecting the rare earth sintered magnet body including the dried slurry to heat treatment (step S16).

Figure 2:
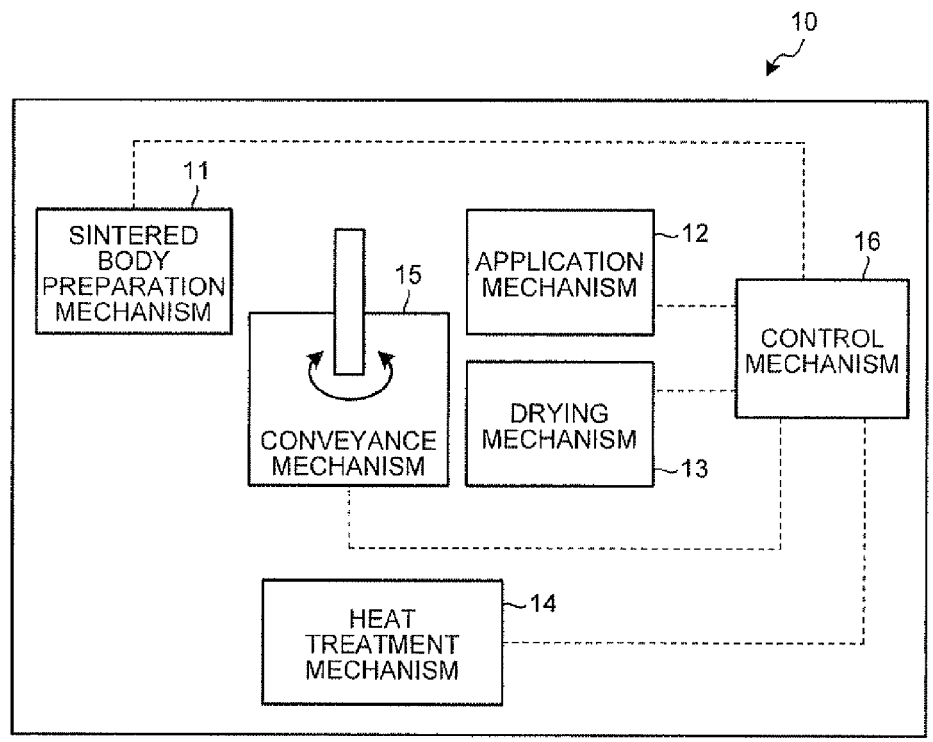
FIG. 2 is a diagram simply illustrating the structure of a magnet producing apparatus.

When the rare earth sintered magnet according to the present embodiment is produced, a magnet producing apparatus is used to produce the rare earth sintered magnet. FIG. 2 is a schematic diagram illustrating the structure of the magnet producing apparatus. As shown in FIG. 2, a magnet producing apparatus 10 includes a sintered body preparation mechanism 11, an application mechanism 12, a drying mechanism 13, a heat treatment mechanism 14, a conveyance mechanism 15, and a control mechanism 16. The control mechanism 16 is a mechanism for controlling the action of each unit. The production of the rare earth sintered magnet according to the present embodiment is not limited to the production using the magnet producing apparatus 10. Any apparatus can be used so long as it can apply the slurry to the rare earth sintered magnet body while the magnet body is rotated.

A description will next be given of the case in which the rare earth sintered magnet according to the present embodiment is produced using the magnet producing apparatus 10 shown in FIG. 2.

<Magnet Body Preparing Step: Step S11>

Figure 3:
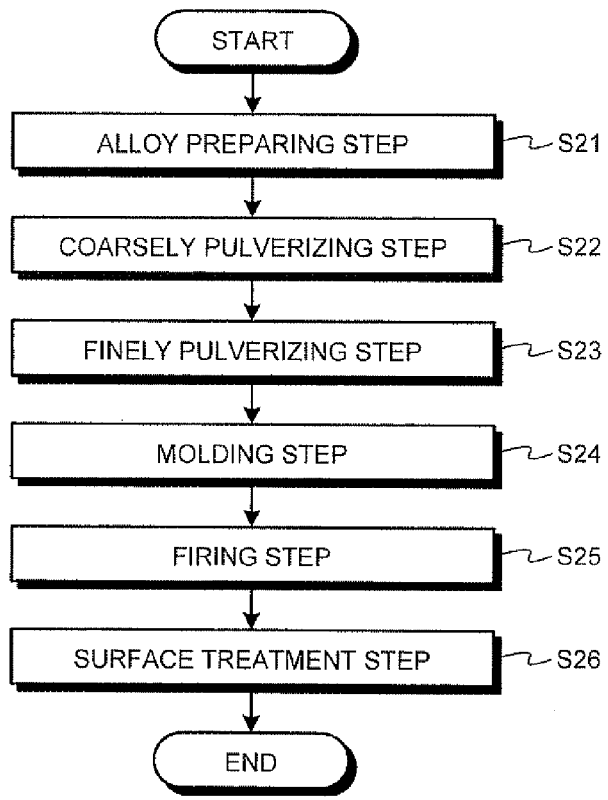
FIG. 3 is a flowchart showing a method for producing a rare earth sintered magnet body used to produce the rare earth sintered magnet according to the embodiment of the present invention.

The magnet body preparing step (step S11) is the step of preparing the rare earth sintered magnet body used to produce the rare earth sintered magnet using the sintered body preparation mechanism 11. FIG. 3 is a flowchart showing a method for producing the rare earth sintered magnet body used to produce the rare earth sintered magnet according to the embodiment of the present invention. As shown in FIG. 3, the method for producing the rare earth sintered magnet body includes the following steps:

an alloy preparing step of preparing an alloy (step S21);
a coarsely pulverizing step of coarsely pulverizing the alloy into a powder (step S22);
a finely pulverizing step of finely pulverizing the coarsely pulverized powder (step S23);
a molding step of molding the finely pulverized raw material powder (step S24);
a firing step of subjecting the molded product to heat treatment to fire the molded product (step S25); and
a surface treatment step of subjecting the sintered body to surface treatment (step S26).

The alloy preparing step (step S21) is the step of preparing an alloy that can provide a rare earth magnet body having the desired composition. In the alloy preparing step (step S21), for example, a single material, an alloy, a compound, etc, that contain elements, such as metals, corresponding to the composition of the rare earth magnet are melted in a vacuum or in an inert gas atmosphere such as an argon atmosphere, and then the melt is used to produce an alloy using, for example, a casting method or a strip casting method. An alloy having the desired composition is thereby produced.

Two types of alloys, i.e., an alloy having the composition of the primary phase of the rare earth magnet (a primary phase alloy) and an alloy having the composition of the boundary phase (a boundary phase alloy) may be used. After the alloy having the desired composition is produced, the process proceeds to the coarsely pulverizing step (step S22).

The pulverizing step (step S22) is the step of coarsely pulverizing the alloy into a powder. In the pulverizing step (step S22), the obtained alloy is coarsely pulverized into a powder having a particle diameter of several hundreds of micrometers. The coarse pulverization of the alloy can be performed using a coarsely pulverizing apparatus such as a jaw crusher, a Brown mill, or a stamping mill or by causing hydrogen to be absorbed into the alloy and then allowing the alloy to be pulverized spontaneously because of the difference in the amount of absorbed hydrogen between different phases (hydrogen decrepitation). After the alloy is coarsely pulverized, the process proceeds to the finely pulverizing step (step S23).

The finely pulverizing step (step S23) is the step of finely pulverizing the powder obtained by the coarse pulverization. In the finely pulverizing step (step S23), the coarsely pulverized powder is pulverized finely to obtain a raw material powder for the rare earth magnet body (hereinafter simply referred to as a "raw material powder") that has a particle size of preferably 1 μm or larger and 10 μm or smaller and more preferably 3 μm or larger and 5 μm or smaller. The fine pulverization is performed by further pulverizing the coarsely pulverized powder using a fine pulverizer such as a jet mill, a ball mill, a vibrating mill, or a wet attritor while the pulverization conditions such as pulverization time are appropriately controlled.

When two types of alloys including a primary phase alloy and a boundary phase alloy are prepared using the above-described alloy production procedure, the alloys may be coarsely pulverized and then finely pulverized separately, and the obtained two types of fine powders may be mixed to prepare a raw material powder.

After the coarsely pulverized powder is finely pulverized, the process proceeds to the molding step (step S24).

The molding step (step S24) is the step of molding the finely pulverized raw material powder into an intended shape. In the molding step (step S24), the molding is performed while a magnetic field is applied so that the desired alignment of the raw material powder is obtained. The molding may be performed by, for example, press molding. More specifically, after the raw material powder is filled into the cavity of a mold, the filled powder is sandwiched between an upper punch and a lower punch to pressurize the powder, and the raw material powder can thereby be molded into the desired shape. No particular limitation is imposed on the shape of the molded product obtained by molding. The powder can be molded into any shape, such as a flat plate shape, a columnar shape, or a ring shape, which is determined by the shape of the mold used that is selected according to the desired shape of the rare earth magnet body. In the present embodiment, the molded product has a flat plate shape. The pressure during molding is preferably 0.5 ton/cm$^2$ or higher and 1.4 ton/cm$^2$ or lower. The magnetic field applied is preferably 12 kOe or higher and 20 kOe or lower. In addition to the above-described dry molding in which the raw material powder itself is molded, wet molding in which a slurry obtained by dispersing the raw material powder in a solvent such as an oil is molded can be used as the molding method. After the molded product is obtained by molding the finely pulverized raw material powder into the intended shape, the process proceeds to the firing step (step S25).

The firing step (step S25) is the step of subjecting the molded product to heat treatment to fire the molded product. In the firing step (step S25), firing is performed by subjecting the molded product to heat treatment, for example, at 1010° C. or higher and 1110° C. or lower in a vacuum or in the presence of an inert gas for 2 hours or longer and 6 hours or shorter. During the heat treatment, the raw material powder undergoes liquid phase sintering, and a sintered body (a sintered rare earth magnet body) with an increased volume ratio of the primary phase is thereby obtained. After the sintered body is obtained, the process proceeds to the surface treatment step (step S26).

The surface treatment step (step S26) is the step of treating the surface of the sintered body with an acid solution. In the surface treatment step (step S26), the obtained sintered body is appropriately processed into desired size and shape, and its surface is treated with, for example, an acid solution. A solution mixture of an alcohol and an aqueous solution of nitric acid, hydrochloric acid, etc. is preferred as the acid solution used for the surface treatment of the sintered body. The surface treatment can be performed by, for example, immersing the sintered body in the acid solution or spraying the acid solution onto the sintered body.

With such surface treatment, soil, an oxide layer, etc. adhering to the sintered body can be removed, and a clean surface can thereby be obtained. This is advantageous for adhesion and diffusion of the compound of the rare earth element R2 described later. To remove soil, an oxide layer, etc. in a more preferred manner, the surface treatment may be performed while ultrasonic waves are applied to the acid solution.

As described above, in the magnet body preparing step (step S11), the sintered body is subjected to surface treatment to obtain the rare earth sintered magnet body. The rare earth sintered magnet body is prepared by molding the raw material powder into a predetermined shape in the molding step (step S24). However, the prepared rare earth sintered magnet body may be further processed into any shape. In such a case, the rare earth sintered magnet body is shaped into a predetermined shape by, for example, press molding, stamping, cutting, etc. In the magnet body preparing step (step S11), the molded body is formed into a flat plate shape in the molding step (step S24). Therefore, in the present embodiment, an example in which the flat plate-shaped rare earth sintered magnet body is used will be described.

The sintered body preparation mechanism 11 prepares a plurality of rare earth sintered magnet bodies 21 and holds these rare earth sintered magnet bodies 21. In the magnet producing apparatus 10, each rare earth sintered magnet body 21 prepared by the sintered body preparation mechanism 11 is conveyed to the application mechanism 12 by the conveyance mechanism 15. The conveyance mechanism 15 is a conveyance mechanism for conveying the sintered bodies and conveys each rare earth sintered magnet body 21 prepared by the sintered body preparation mechanism 11 to the application mechanism 12. Various types of means can be used as the conveyance mechanism 15. For example, a belt conveyer or a robot arm may be used. In the magnet producing apparatus 10, after the rare earth sintered magnet body 21 is conveyed to the application mechanism 12 by the conveyance mechanism 15, the process proceeds to the rotating step (step S12).

<Rotating Step: Step S12>

Figure 4:
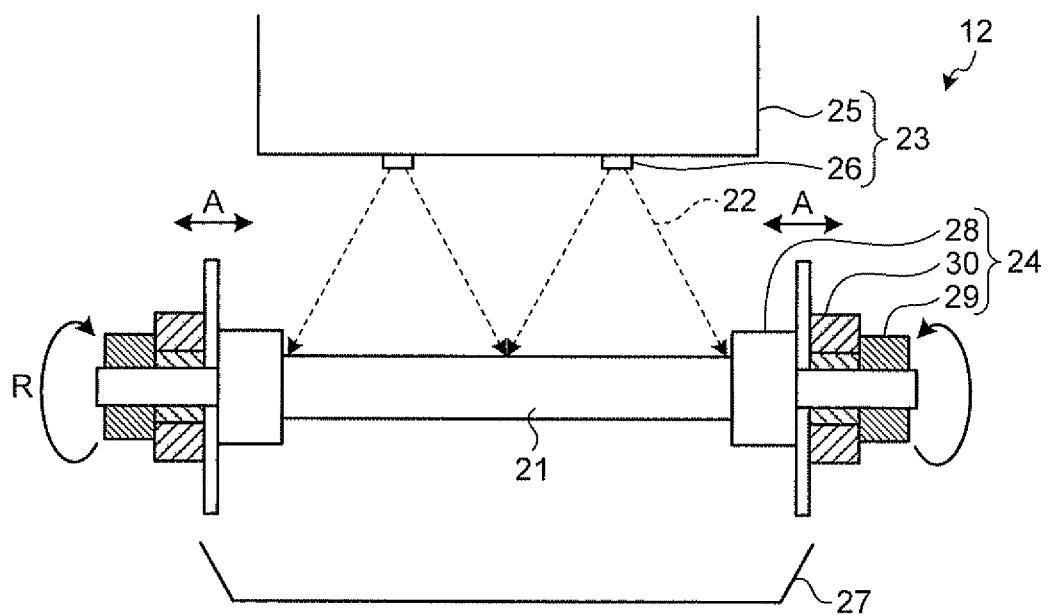
FIG. 4 is a diagram simply illustrating the structure of an application mechanism.

The rotating step (step S12) used in the magnet producing apparatus 10 is the step of rotating the rare earth sintered magnet body conveyed from the sintered body preparation mechanism 11 by the conveyance mechanism 15, with the rare earth sintered magnet body being held by the application mechanism 12. FIG. 4 is a schematic diagram simply illustrating the structure of the application mechanism. As shown in FIG. 4, the application mechanism 12 includes application means 23 for applying a slurry 22 to the rare earth sintered magnet body 21 and rotating-holding means 24 for holding the rare earth sintered magnet body 21 and rotating the held rare earth sintered magnet body 21. The application means 23 includes a spray head 25, a plurality of nozzles 26 disposed on the lower surface of the spray head 25, and a slurry collecting unit 27 disposed on the vertically lower side of the spray head 25 and used to collect the slurry 22 ejected from the nozzles 26. The application means 23 is used to apply the slurry 22 to the rare earth sintered magnet body 21 in the applying step (step S13) described later.

The rotating-holding means 24 includes contact sections 28, rotating sections 29, and mounting sections 30. The rotating-holding means 24 has a left-right symmetric shape with respect to a symmetry plane perpendicular to a rotation axis and has a structure in which the two contact sections 28 are brought into contact with the opposite ends of the rare earth sintered magnet body 21 to sandwich the rare earth sintered magnet body 21.

In the magnet producing apparatus 10, after the rare earth sintered magnet body 21 conveyed to the application mechanism 12 by the conveyance mechanism 15 is held by the rotating-holding means 24, the rotating sections 29 of the rotating-holding means 24 of the application mechanism 12 rotate the contact sections 28 to start rotating the rare earth sintered magnet body 21.

The two contact sections 28 are members that come into contact with the rare earth sintered magnet body 21 and are supported by the rotating sections 29 and the mounting sections 30. The two contact sections 28 are disposed so as to face each other, and the rare earth sintered magnet body 21 is disposed so as to be sandwiched between the two contact sections 28. More specifically, the opposite ends of the rare earth sintered magnet body 21 (the lengthwise ends of the rare earth sintered magnet body 21 in the present embodiment) come into contact with the contact sections 28.

The rotating sections 29 are provided for their corresponding contact sections 28 and are a driving mechanism for rotating the contact sections 28. The rotating sections 29 rotate the contact sections 28 (in R direction in the figure) about a rotation axis parallel to the lengthwise direction of the rare earth sintered magnet body 21. No particular limitation is imposed on the method for rotating the contact sections 28 by the rotating sections 29. In one exemplary method, shafts connecting the rotating sections 29 to the contact sections 28 are connected to a rotation motor through transmission belts (pulleys), and the rotation of the rotation motor is transmitted to the contact sections 28 through the transmission belts to rotate the contact sections 28. The contact sections 28 may be directly connected to motors to rotate the contact sections 28.

The mounting sections 30 rotatably support the contact sections 28 and are movable in a direction parallel to the rotation axis (a direction of arrow A in the figure). By moving the contact sections 28 in the direction parallel to the rotation axis (the direction of arrow A in the figure), the mounting sections 30 are moved in the direction parallel to the rotation axis, so that the distance between the two contact sections 28 can be adjusted. By increasing the distance between the two contact sections 28 such that the distance is longer than the lengthwise length of the rare earth sintered magnet body 21, the rare earth sintered magnet body 21 can be mounted and dismounted. The mounting sections 30 can be moved with the rare earth sintered magnet body 21 being held.

As described above, the rotating-holding means 24 allows the rare earth sintered magnet body 21 to be mounted and dismounted by moving the contact sections 28 in the direction parallel to the rotation axis through the mounting sections 30. The rotating-holding means 24 also allows the rare earth sintered magnet body 21 to rotate about the rotation axis by rotating the contact sections 28 about the rotation axis through the rotating sections 29. In the magnet producing apparatus 10, after the rare earth sintered magnet body 21 is rotated by the rotating-holding means 24, the process proceeds to the applying step (step S13).

<Applying Step: Step S13>

In the applying step (step S13), the slurry containing the rare earth compound is applied to the rotating rare earth sintered magnet body 21. The application means 23 includes the spray head 25, the plurality of nozzles 26 disposed on the lower surface of the spray head 25, and the slurry collecting unit 27 disposed on the vertically lower side of the spray head 25 and used to collect the slurry 22 ejected from the nozzles 26. The spray head 25 is a reservoir unit for temporarily storing the slurry 22 supplied from a slurry circulating unit 31 and for pressurizing the slurry 22 to a certain pressure or higher. The plurality of nozzles 26 are formed in a row on the lower surface of the spray head 25 and spray the slurry 22 supplied from the spray head 25 at a certain pressure or higher in a mist form. The slurry collecting unit 27 collects the slurry 22 that has been sprayed from the nozzles 26 of the spray head 25 and has not adhered to the rare earth sintered magnet body 21. The slurry collecting unit 27 is composed of a receiving pan having inclined side surfaces, and the slurry 22 adhering to the side surfaces flows toward a lower surface in which a collecting port for collecting the slurry 22 is formed.

When the slurry 22 is applied to the rare earth sintered magnet body 21, the application mechanism 12 moves the rare earth sintered magnet body 21 held by the rotating-holding means 24 to a position between the spray head 25 and the slurry collecting unit 27 while the rare earth sintered magnet body 21 is rotated, as shown in FIG. 4. In the application mechanism 12, while the rare earth sintered magnet body 21 held by the rotating-holding means 24 is rotated, the slurry 22 is applied by the application means 23. By spraying the slurry 22 from the nozzles 26 of the application means 23, the slurry 22 can be applied to the rare earth sintered magnet body 21 located on the vertically lower side of the nozzles 26. The rare earth sintered magnet body 21 located at a position onto which the slurry 22 ejected from the nozzles 26 falls comes into contact with the slurry 22 while changing its attitude. In this manner, almost the entire surface of the rare earth sintered magnet body 21 passes through the arrival positions of the slurry 22, and the slurry 22 ejected from the nozzles 26 is thereby applied. The slurry 22 that has not been applied to the rare earth sintered magnet body 21, i.e., has not adhered thereto, is collected by the slurry collecting unit 27 disposed on the vertically lower side of the rare earth sintered magnet body 21.

Figure 5:
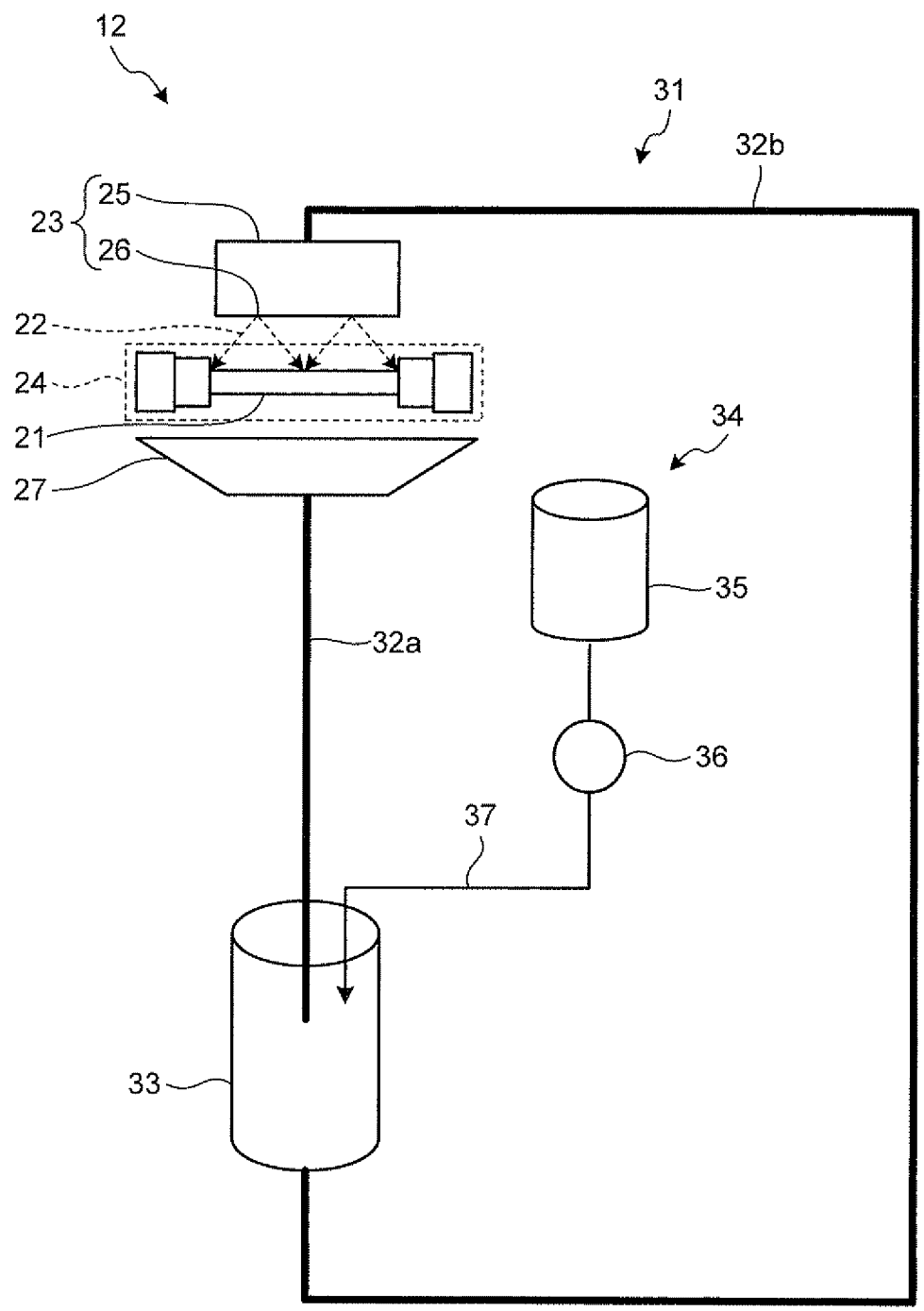
FIG. 5 is a diagram simply illustrating the structure of application means.

FIG. 5 is a schematic diagram simply illustrating the structure of the application means. As shown in FIG. 5, the application means 23 includes the slurry circulating unit 31 for supplying the slurry 22 to the spray head 25 and collecting the slurry 22 from the slurry collecting unit 27 to circulate the collected slurry 22. The slurry 22 received by the slurry collecting unit 27 is collected in a slurry tank 33 through a pipe 32a. The slurry tank 33 is a tank for storing the slurry 22 and stores a predetermined amount of slurry 22. The slurry tank 33 is connected to the spray head 25 through a pipe 32b, so that the collected slurry 22 is circulated and again supplied to the spray head 25.

The application mechanism 12 further includes a concentration adjusting unit 34 for adjusting the concentration of the slurry 22 circulated by the slurry circulating unit 31. The concentration adjusting unit 34 includes a solvent tank 35 and a pump 36. The solvent tank 35 is a tank for storing a solvent constituting the slurry 22 and is connected to the slurry tank 33 through a pipe 37. The concentration adjusting unit 34 supplies the solvent stored in the solvent tank 35 to the slurry tank 33 through the pump 36 disposed in the pipe 37 so that the density of the slurry 22 in the slurry tank 33 is maintained in a predetermined range. By maintaining the density of the slurry 22, the ratio of the solvent to the solute (the rare earth compound) can be maintained in a predetermined range, and the concentration of the slurry 22 can thereby be maintained in a predetermined range.

The slurry 22 is sprayed from the plurality of nozzles 26 toward the rare earth sintered magnet body 21 as described above, and the slurry 22 can thereby be applied to the surface of the sintered body. By the configuration like the present embodiment in which the slurry 22 is simply sprayed, the slurry 22 can be moved toward the sintered body.

As in the present embodiment, a plurality of nozzles 26 are provided and arranged in a row. With this configuration, the slurry 22 is prevented from being applied unevenly depending on the position on the sintered body and can be applied uniformly. More specifically, since the plurality of nozzles 26 are provided and arranged at predetermined intervals, even when the streams of slurry are concentrated on the centers of the openings, the slurry 22 can be appropriately ejected toward the edge sides of the row.

The method for applying the slurry 22 to the sintered body is not limited to the method in which the slurry 22 is applied using the sprays, and various means for applying the slurry 22 can be used. For example, as shown in FIG. 6, the rare earth sintered magnet body 21 may be immersed in a slurry bath 38 storing the slurry 22 and rotated so that the slurry 22 is applied to the rare earth sintered magnet body 21.

As shown in FIG. 7, the slurry 22 may be applied to the rare earth sintered magnet body 21 by ejecting (dropping) the slurry 22 as vertically (directly) downward slurry streams from nozzles 39 disposed on the lower surface of the spray head 25 while the rare earth sintered magnet body 21 is rotated. The plurality of nozzles 39 are provided and arranged in a row, and therefore the slurry 22 is prevented from being applied unevenly depending on the position on the sintered body and can be applied uniformly. More specifically, since the plurality of nozzles 39 are provided and arranged at predetermined intervals, even when the streams of slurry are concentrated on the centers of the openings, the slurry 22 can be appropriately ejected toward the edge sides of the row.

With the applying method in which the slurry 22 is ejected from the nozzles 39, the ejection of the slurry 22 can be easily controlled by using a simple structure in which the slurry 22 is ejected vertically downward from the nozzles 39. However, the present invention is not limited to this simple structure, so long as the slurry 22 can be applied to the sintered body. The slurry 22 may be ejected from the nozzles 39 in a slanting direction or a horizontal direction.

The thickness of the film applied to the rare earth sintered magnet body 21 can be controlled by adjusting the concentration of the slurry 22. More specifically, by increasing the concentration of the slurry 22, the film thickness can be increased. By reducing the concentration of the slurry 22, the film thickness can be reduced.

The concentration adjusting unit 34 maintains the density of the slurry 22 preferably in the range of a reference value±0.050 g/cc, i.e., within a density width of 0.100 g/cc, and more preferably in the range of the reference value±0.035 g/cc, i.e., within a density width of 0.070 g/cc. By adjusting the density of the slurry 22 in the above range, variations in performance of produced magnets can be suppressed.

It is sufficient that the concentration of the slurry 22 is equal to or higher than a concentration that allows the slurry 22 to be applied to the rare earth sintered magnet body 21 to a target thickness, and the lower limit of the concentration is not particularly set. The concentration of the slurry 22 is preferably 70 wt % or lower and more preferably 60 wt % or lower. By adjusting the concentration of the slurry 22 to 70 wt % or lower, the slurry 22 is allowed to be appropriately moved on the sintered body. By rotating the sintered body, the thickness of the slurry 22 can be made uniform.

In the magnet producing apparatus 10, after the slurry 22 is applied to the rare earth sintered magnet body 21 using the application mechanism 12, the process proceeds to the drying step (step S14).

<Drying Step: Step S14>

The drying step (step S14) is the step of drying the slurry 22 adhering (applied) to the rare earth sintered magnet body 21. The conveyance mechanism 15 conveys the rare earth sintered magnet body 21 from the application mechanism 12 to the drying mechanism 13. During conveyance, the rare earth sintered magnet body 21 is moved to the drying mechanism 13 while being rotated by the rotating-holding means 24. In the drying mechanism 13, the solvent contained in the slurry 22 applied to the sintered body by the application mechanism 12 is volatilized while the rare earth sintered magnet body 21 held by the rotating-holding means 24 is rotated, and the sintered body to which the slurry 22 has been applied is thereby dried while being rotated.

Various drying methods can be used in the drying mechanism 13. For example, a drying method by heating or blowing air can be used. The rare earth sintered magnet body 21 to which the slurry 22 has been applied may be air-dried. In the magnet producing apparatus 10, after the slurry 22 adhering to the rare earth sintered magnet body 21 is dried, the process proceeds to the rotation stopping step (step S15).

<Rotation Stopping Step: Step S15>

The rotation stopping step (step S15) is the step of stopping the driving of the rotating sections 29 of the rotating-holding means 24 to stop the rotation of the rare earth sintered magnet body 21. In the magnet producing apparatus 10, after the conveyance mechanism 15 retrieves the rare earth sintered magnet body 21 held by the rotating-holding means 24, the process proceeds to the heat treatment step (step S16).

<Heat Treatment Step: Step S16>

In the heat treatment step (step S16), the rare earth sintered magnet body 21 is subjected to heat treatment. In this step, the heat treatment preformed allows the compound of the rare earth element R2 contained in the slurry 22 adhering to the surface to diffuse. The heat treatment mechanism 14 is a mechanism for subjecting the rare earth sintered magnet body 21 including the slurry 22 dried by the drying mechanism 13 to heat treatment. The heat treatment mechanism 14 heats the conveyed rare earth sintered magnet body 21 at a predetermined temperature for a predetermined time. In the magnet producing apparatus 10, the rare earth sintered magnet is produced by performing the heat treatment to diffuse the compound of the rare earth element R2 into the rare earth sintered magnet body 21, and the process is ended.

When the heat treatment is performed to allow the compound of the rare earth element R2 contained in the slurry 22 to be absorbed into the rare earth sintered magnet body 21, the heat treatment is performed in a vacuum or in an inert gas atmosphere at a reduced pressure. Ar or He, for example, is used as the inert gas. By performing the heat treatment in a vacuum or in an inert gas atmosphere at a reduced pressure, the supply of the compound of the rare earth element R2 from the surface of the rare earth sintered magnet body to the interior thereof is facilitated. The heat treatment temperature is set to be lower than the sintering temperature of the rare earth sintered magnet body 21. This is because when the heat treatment is performed at a temperature equal to or higher than the sintering temperature of the rare earth sintered magnet body 21, the structure of the rare earth sintered magnet may be changed. In addition, when doing so, the compound of the rare earth element R2 may diffuse not only in the crystal grain boundaries of the rare earth sintered magnet body 21 but also into the interior of the crystal grains, so that the residual magnetic flux density Br on the surface of the rare earth sintered magnet body 21 may decrease. Specifically, the heat treatment temperature is 600° C. or higher and 1000° C. or lower, and preferably 800° C. or higher and 950° C. or lower.

Aging treatment may be performed after the heat treatment. The aging treatment improves the coercive force. The aging treatment temperature is 400° C. or higher and 650° C. or lower, and more preferably 450° C. or higher and 600° C. or lower.

As described above, in the magnet producing apparatus 10, the slurry 22 is applied to the rare earth sintered magnet body 21 while the magnet body is rotated, and the rare earth sintered magnet body 21 is continuously rotated until drying is completed. In this manner, the slurry 22 can be uniformly applied to the rare earth sintered magnet body 21. In the magnet producing apparatus 10, the rare earth sintered magnet body 21 to which the slurry 22 has been uniformly applied is subjected to heat treatment. In this manner, unevenness in coercive force HcJ, residual magnetic flux density Br, etc. on the surface of the rare earth sintered magnet body 21 can be reduced. Since the unevenness in coercive force HcJ, residual magnetic flux density Br, etc. on the surface of the rare earth sintered magnet body 21 can be reduced as described above, the performance as a magnet can be improved. When the magnet is used for, for example, a magnet for a motor, the occurrence of cogging, for example, can be suppressed.

As in the present embodiment, the slurry 22 containing the compound of the rare earth element R2 dissolved therein is applied to the rare earth sintered magnet body 21 to allow the compound of the rare earth element R2 to adhere to the rare earth sintered magnet body 21. In this manner, the adhesion of the compound of the rare earth element R2 to regions other than the surface of the rare earth sintered magnet body 21 can be suppressed. Therefore, the compound of the rare earth element R2 can be used efficiently. With a method in which the compound of the rare earth element R2 is adhered by vapor deposition, the rare earth compound adheres to regions other than the rare earth sintered magnet body 21. In the present embodiment, the slurry 22 containing the compound of the rare earth element R2 is sprayed from the nozzles 26 in the application means 23 while the rare earth sintered magnet body 21 is rotated, and the slurry 22 can thereby be applied to the rare earth sintered magnet body 21. In this manner, the adhesion of the rare earth compound to regions other than the rare earth sintered magnet body 21 can be suppressed, and therefore the compound of the rare earth element R2 can be efficiently used. As in the present embodiment, the slurry 22 is collected, circulated, and reused. Therefore, the compound of the rare earth element R2 can be used with no waste.

As in the present embodiment, the contact sections 28 come into contact only with the opposite ends of the rare earth sintered magnet body 21. With this configuration, the slurry 22 can be applied to the entire surface of the rare earth sintered magnet body 21 except for the portions in contact with the contact sections 28. This can reduce the area of the rare earth sintered magnet body 21 with which the slurry 22 is not coated because of the contact sections 28. Therefore, a magnet having more uniform performance can be produced. In the present embodiment, the two contact sections 28 are brought into contact with the opposite ends of the rare earth sintered magnet body 21 to sandwich it between the two contact sections 28, but the present invention is not limited thereto. For example, only one end of the rare earth sintered magnet body 21 may be held by one of the contact sections 28.

As in the present embodiment, the rotation of the rare earth sintered magnet body 21 is started, and the application of the slurry 22 is started while the rare earth sintered magnet body 21 is rotated. In this manner, the slurry 22 is prevented from being accumulated on the rare earth sintered magnet body 21 more than necessary, and splashes of the slurry 22 can be suppressed. In addition, since the application of the slurry 22 can be completed in a short time in an appropriate manner, energy efficiency and operation efficiency can be improved. Moreover, the slurry 22 can be applied efficiently. In the present embodiment, the rotation of the rare earth sintered magnet body 21 is started before the slurry 22 is applied to the rare earth sintered magnet body 21, but the present invention is not limited thereto. For example, in the application mechanism 12, the rotation of the rare earth sintered magnet body 21 may be started after the application of the slurry 22 so that the thickness of the slurry 22 adhering to the surface of the rare earth sintered magnet body 21 is made uniform.

Examples of the method for adhering the compound of the rare earth element R2 to the rare earth sintered magnet body 21 include a plating method and a vapor deposition method. When the plating method is used, a so-called dog-bone phenomenon occurs in which the thickness of the plating film at the corners of the rare earth sintered magnet body 21 is several times (e.g., 2 to 3 times) larger than the thickness in other areas of the rare earth sintered magnet body 21, so that the film formed of the compound of the rare earth element R2 cannot be uniform.

When the vapor deposition method is used, the thickness of the film containing the compound of the rare earth element R2 and formed on the surface of the rare earth sintered magnet body 21 is affected due to the distance between the rare earth sintered magnet body 21 and a bulk body containing the compound of the rare earth element R2. Therefore, it is difficult to obtain a magnet having a stable film thickness, and it is difficult to obtain a magnet having stable characteristics. When vapor deposition is performed while heat treatment is performed, a jig, etc. used for vapor deposition are deformed. Therefore, it is more difficult to maintain constant the distance between the rare earth sintered magnet body 21 and the bulk body containing the compound of the rare earth element R2. When a rare earth compound such as R2 is diffused over the surface of the rare earth sintered magnet body 21, the degree of improvement in coercive force HcJ and the degree of reduction in residual magnetic flux density Br tend to be large in the corners of the rare earth sintered magnet body 21 because the number of diffusion surfaces is large at the corners. In the vapor deposition method, since the reactivity of R2 is high, the degree of unevenness in coercive force HcJ and the degree of unevenness in residual magnetic flux density Br tend to become larger.

However, according to the present embodiment, the slurry 22 is applied to the surface of the rare earth sintered magnet body 21 while the rare earth sintered magnet body 21 is rotated. Therefore, the slurry 22 can be easily applied to the surface of the rare earth sintered magnet body 21 to a uniform thickness in a short time at low cost.

As described above, according to the present embodiment, a rare earth sintered magnet can be obtained by applying the slurry 22 to the surface of the rare earth sintered magnet body 21 and then drying the slurry 22. A magnet product can be obtained by magnetization. In addition, the corrosion resistance of the rare earth sintered magnet may be improved by subjecting the surface of the rare earth sintered magnet to surface treatment such as Ni plating. Such a rare earth sintered magnet is suitably used as a magnet for a surface permanent magnet (SPM) motor in which the magnet is attached on the surface of a rotor, as a magnet for an IPM (Interior Permanent Magnet) motor, and as a magnet for a PRM (Permanent magnet Reluctance Motor). Particularly, the SPM motor has advantages in that its gap magnetic flux density can be easily improved and that the amount of noise generated is small. Therefore, the SPM motor is suitably used for applications such as spindle motors and voice coil motors for rotating the hard disks of hard disk drives, motors for the power steering systems of automobiles, servo motors for machine tools, motors for the vibrators of mobile phones, and motors for printers.

<Motor>

Figure 8:
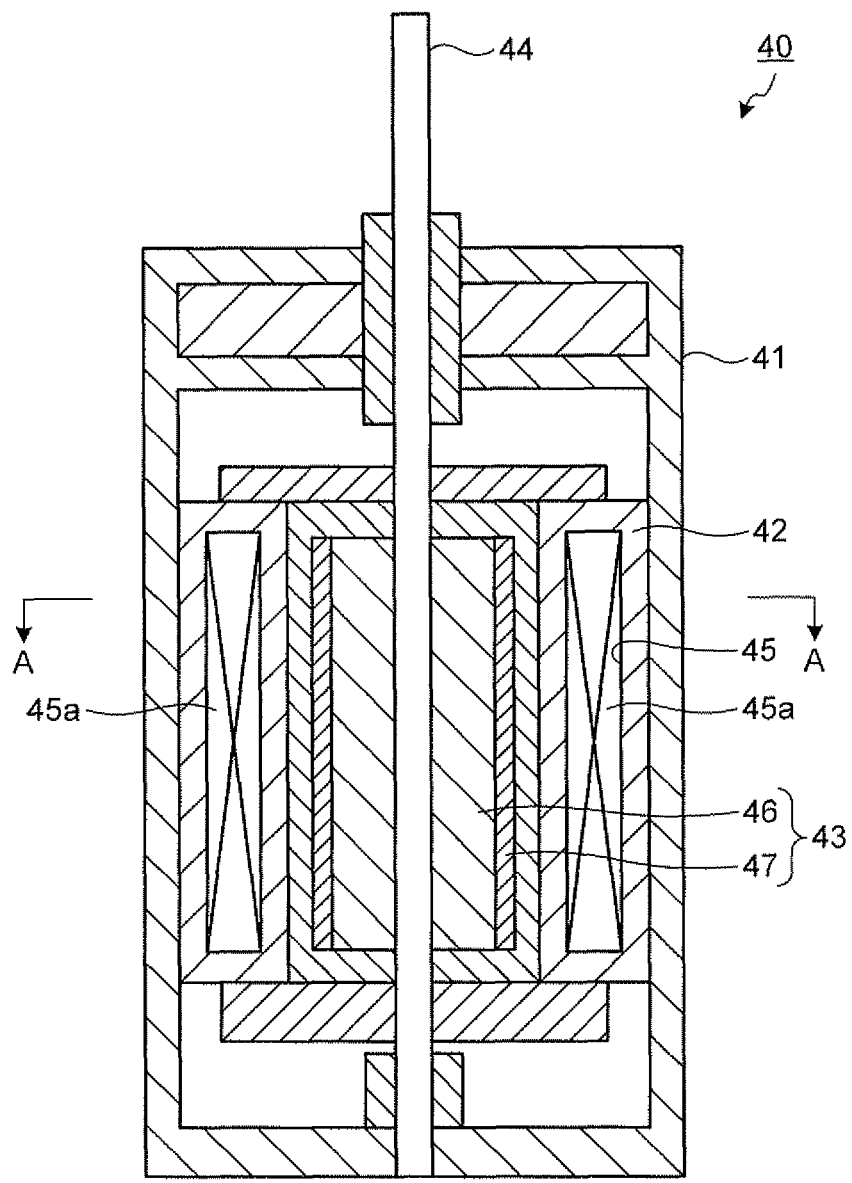
FIG. 8 is a vertical cross-sectional view simply illustrating the structure of one embodiment of a motor.
Figure 9:
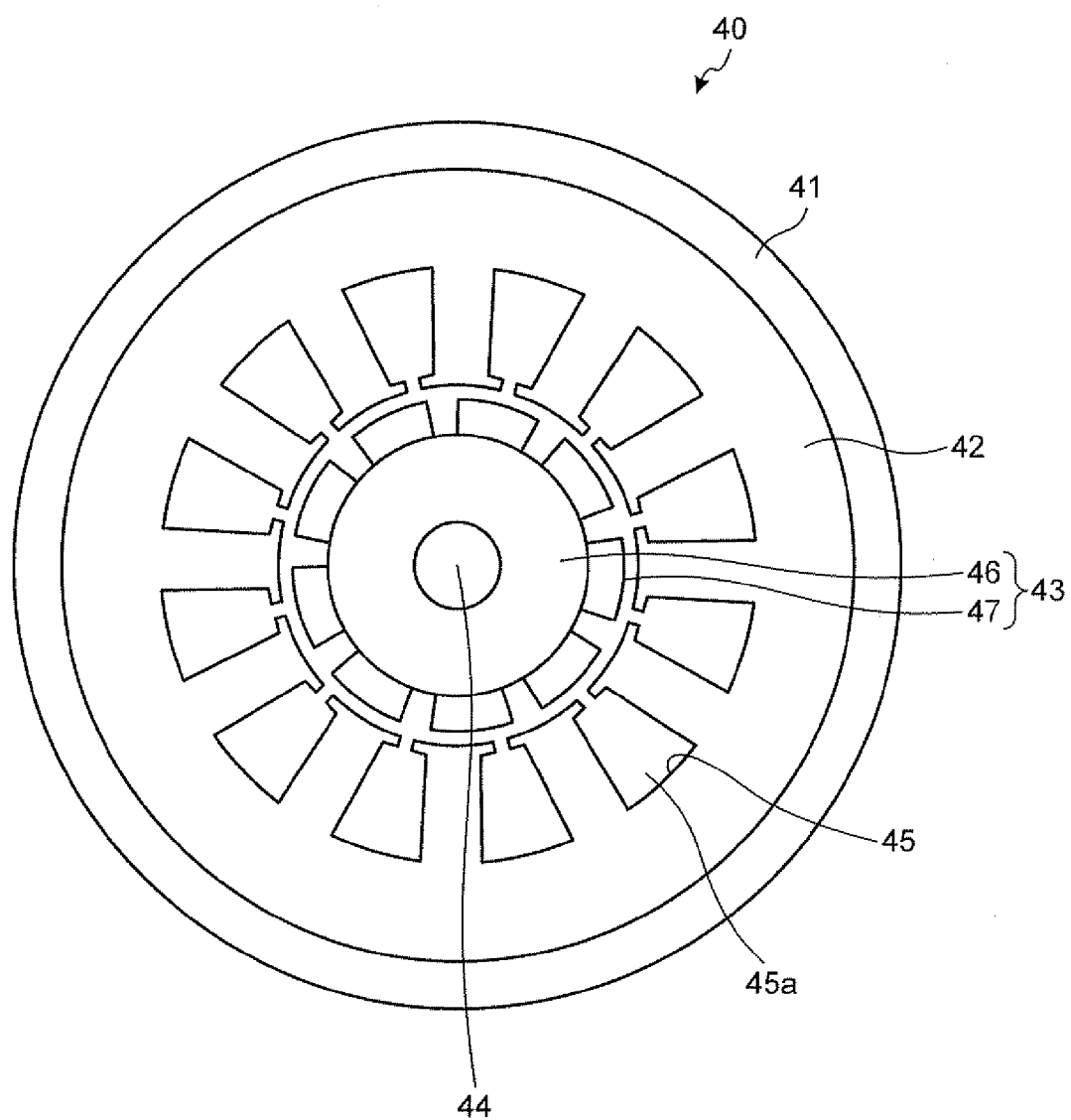
FIG. 9 is a diagram simply showing a cross-section along A-A direction in FIG. 8.

A description will be given of a preferred embodiment in which the rare earth sintered magnet according to the present embodiment is used for a motor. In this section, an example will be described in which the rare earth sintered magnet according to the present embodiment is applied to an SPM motor. FIG. 8 is a vertical cross-sectional view simply illustrating the structure of one embodiment of the SPM motor, and FIG. 9 is a diagram simply showing a cross-section along A-A direction in FIG. 8. As shown in FIGS. 8 and 9, a motor 40 includes a cylindrical stator 42, a columnar rotor 43, and a rotation shaft 44 that are disposed in a housing 41. The rotation shaft 44 passes through the center of the horizontal cross-section of the rotor 43. The stator 42 has a plurality of slots 45 formed circumferentially in its inner tubular wall (inner circumferential wall) at predetermined intervals. A coil 45a is wound around each slot 45. The rotor 43 includes a columnar rotor core 46 (iron core) formed of, for example, an iron material and a plurality of permanent magnets 47 disposed on the outer circumference of the rotor core 46 at predetermined intervals. The rotor 43, together with the rotation shaft 44, is rotatably disposed in a space inside the stator 42. The rare earth sintered magnet according to the present embodiment is used as each of the permanent magnets 47.

In the motor 40, since the rare earth sintered magnet according to the present embodiment is used as each of the permanent magnets 47, unevenness in coercive force HcJ, residual magnetic flux density Br, etc. on the surface of each permanent magnet 47 can be reduced. Therefore, the occurrence of demagnetization caused by the demagnetizing field generated by the coils 45a during rotation of the motor 40 can be suppressed. In the motor 40, the occurrence of cogging torque and torque ripple can be reduced due to this configuration, and therefore the performance of the motor such as its torque characteristics can be improved.

EXAMPLES

The present invention will next be more specifically described by way of Examples and Comparative Examples, but the invention is not limited to the following Examples.

Production of Rare Earth Sintered Magnets

Example 1

Production of Rare Earth Sintered Magnet Body

A rare earth sintered magnet body (sintered body magnet) 21 was produced by the method described below. First, a primary phase alloy forming mainly the primary phase of a magnet and a grain boundary alloy forming mainly grain boundaries were casted by the strip casting (SC) method. The composition of the primary phase alloy was 23.0 wt % Nd-2.6 wt % Dy-5.9 wt % Pr-0.5 wt % Co-0.18 wt % Al-1.1 wt % B-bal. Fe, and the composition of the grain boundary alloy was 30.0 wt % Dy-0.18 wt % Al-0.6 wt % Cu-bal. Fe.

Next, these raw material alloys were coarsely pulverized separately by hydrogen decrepitation and then pulverized separately by a jet mill using high-pressure $N_2$ gas to obtain respective fine powders each having an average particle diameter D of 4 μm. The obtained fine powder of the primary phase alloy and the fine powder of the grain boundary alloy were mixed in a ratio of primary phase alloy:grain boundary alloy=9:1 to prepare a magnetic powder used as the raw material powder for the rare earth sintered magnet body. Then molding was performed using the prepared magnetic powder in a magnetic field under the conditions of a molding pressure of 1.2 t/cm² and an alignment magnetic field of 15 kOe to obtain a molded product. The molded product had a flat plate shape, and its flat faces were perpendicular to the alignment direction. Then the obtained molded product was fired under the condition of 1060° C. for 4 hours to produce a rare earth sintered magnet body 21 for a rare earth sintered magnet that had the above-described composition. Then the produced rare earth sintered magnet body 21 was subjected to surface treatment. More specifically, the rare earth sintered magnet body 21 was immersed in a solution mixture of 3 wt % $HNO_3$/$C_2H_5OH$ for 3 minutes and washed twice with $C_2H_5OH$. The above treatment was performed while ultrasonic waves were applied.

(Production of Slurry)

Next, the slurry 22 to be adhered to the rare earth sintered magnet body 21 was produced as follows. First, 5 parts by mass of butyral resin (product name: BM-S, product of SEKISUI CHEMICAL Co., Ltd.) was dissolved in 550 parts by mass of isopropyl alcohol to prepare a resin solution. Then the prepared resin solution and 445 parts by mass of Dy hydride ($DyH_2$) (average particle diameter D: 5 μm) were fed to a ball mill, and the mixture was dispersed using 3 mm zirconia balls in an Ar atmosphere for 10 minutes to produce a slurry. The Dy hydride used was produced by allowing Dy power to absorb hydrogen in a hydrogen atmosphere at 350° C. for 1 hour and then treating the powder in an Ar atmosphere at 600° C. for 1 hour. The thus-obtained $DyH_2$ was subjected to X-ray diffraction measurement. The identification of $DyH_2$ can be made on the analogy of $ErH_2$ in JCPDS card (formerly ASTM card) 47-978.

(Application and Drying of Slurry)

The slurry 22 produced as above was fed to the slurry tank 33 of the application mechanism 12 and circulated at a flow rate of 500 cc/min. To prevent concentration fluctuations due to volatilization of the solvent during circulation, the density of the slurry 22 was adjusted to the range of 1.258 (g/cc) to 1.263 (g/cc) using the concentration adjusting unit 34. The pump 36 was activated according to the results of measurement to feed the solvent from the solvent tank 35 to the slurry tank 33. Next, with the rare earth sintered magnet body 21 being held by the rotating-holding means 24, the rare earth sintered magnet body 21 was rotated using the rotating sections 29 at a rotation speed of 20 rpm. The slurry 22 was sprayed from the nozzles 26 toward the rotating rare earth sintered magnet body 21 for 5 seconds by the spray method to apply the slurry 22. Then the slurry was dried while the rare earth sintered magnet body 21 was still rotated. A slurry layer containing $DyH_2$ was thereby formed on the surface of the rare earth sintered magnet body 21. The slurry 22 was applied such that the thickness of the slurry layer was about 20 μm. By adjusting the thickness of the slurry layer to about 20 μm, $DyH_2$ can be adhered to the surface of the rare earth sintered magnet body 21 in an amount of 5.0 mg/cm².

Then the dried rare earth sintered magnet body 21 was subjected to heat treatment at 900° C. for 5 hours and then to aging treatment at 540° C. for 1 hour to produce a rare earth sintered magnet. The size of the obtained rare earth sintered magnet was 2 mm (thickness: magnetic anisotropic direction)×45 mm×30 mm.

Example 2

In the method used in Example 2, the application mechanism 12 having the configuration shown in FIG. 6 was used, and the rare earth sintered magnet body 21 was immersed in the slurry bath 38 to coat the rare earth sintered magnet body 21 with the slurry 22. In Example 2, a rare earth sintered magnet was produced under the same conditions as in Example 1 except that the rare earth sintered magnet body 21 was immersed in the slurry bath 38 for 5 seconds and then rotated at 20 rpm by the rotating sections 29, as shown in FIG. 6.

Example 3

In the method used in Example 3, the application mechanism 12 having the configuration shown in FIG. 7 was used, and the slurry 22 was ejected as slurry streams toward the rare earth sintered magnet body 21 to coat the rare earth sintered magnet body 21 with the slurry 22. In Example 3, a rare earth sintered magnet was produced under the same conditions as in Example 1 except that the slurry 22 was ejected (dropped) as vertically (directly) downward slurry streams from the nozzles 39 disposed on the lower surface of the spray head 25 to apply the slurry 22 to the rare earth sintered magnet body 21 while the rare earth sintered magnet body 21 was rotated, as shown in FIG. 7.

In Example 3, the above-produced slurry 22 was fed to the slurry tank 33 of the application mechanism 12 and circulated at a flow rate of 500 cc/min. To prevent concentration fluctuations due to volatilization of the solvent during circulation, the density of the slurry 22 was adjusted to the range of 1.258 (g/cc) to 1.263 (g/cc) using the concentration adjusting unit 34. The pump 36 was activated according to the density of the slurry 22 to feed the solvent from the solvent tank 35 to the slurry tank 33. Next, with the rare earth sintered magnet body 21 being held by the rotating-holding means 24, the rare earth sintered magnet body 21 was rotated at a rotation speed of 20 rpm. The slurry 22 was applied from the nozzles 39 to the rotating rare earth sintered magnet body 21 for 5 seconds and then dried while the rare earth sintered magnet body 21 was rotated.

Example 4

In Example 4, a rare earth sintered magnet was produced as in Example 3 under the same conditions as in Example 1 except that the rotation speed was changed to 10 rpm.

Example 5

In Example 5, a rare earth sintered magnet was produced as in Example 3 under the same conditions as in Example 1 except that the rotation speed was changed to 30 rpm, and the characteristics of the produced magnet were measured.

Example 6

In Example 6, a rare earth sintered magnet was produced as in Example 3 under the same conditions as in Example 1 except that the positions for supplying the slurry 22 were changed to side positions.

Example 7

In Example 7, a rare earth sintered magnet was produced as in Example 3 under the same conditions as in Example 1 except that the rotation speed was changed to 60 rpm.

Example 8

In Example 8, a rare earth sintered magnet was produced as in Example 3 under the same conditions as in Example 1 except that the rotation speed was changed to 1 rpm.

Comparative Example 1

In Comparative Example 1, a rare earth sintered magnet was produced by applying and drying the slurry 22 without rotating the rare earth sintered magnet body 21. In Comparative Example 1, the slurry 22 produced in Example 1 was fed to the slurry bath 38 (see FIG. 6), and the rare earth sintered magnet body 21 was immersed in the slurry bath 38 for 10 seconds while ultrasonic waves were applied and was then removed from the slurry bath 38 and dried. The rare earth sintered magnet was produced under the same conditions as in Example 1 except that $DyH_2$ was adhered to the surface of the rare earth sintered magnet body 21 in the manner described above.

Comparative Example 2

In Comparative Example 2, a rare earth sintered magnet was produced by evaporating $DyH_2$ onto the surface of the rare earth sintered magnet body 21 and then diffusing the $DyH_2$ over the surface at high temperature in a high vacuum. More specifically, the rare earth sintered magnet body 21 was pickled with a 0.3% aqueous nitric acid solution, dried, and then placed in a processing container as shown in FIG. 10. FIG. 10 is a diagram illustrating an example of the processing container used to evaporate $DyH_2$ on the surface of the rare earth sintered magnet body 21 and diffuse the $DyH_2$ over the surface. As shown in FIG. 10, a processing chamber 51 is formed of a high-melting point metal material such as Mo, and a pair of supports 53 for supporting nets 52 are disposed inside the processing chamber 51. Rare earth sintered magnet bodies 21 (two in FIG. 10) and RH bulk bodies 54 (two in FIG. 10) were placed on the nets 52. In the processing chamber 51, the rare earth sintered magnet bodies 21 and the RH bulk bodies 54 faced each other and were spaced apart from each other by about 5 mm to 9 mm. Each of the RH bulk bodies 54 used was formed of Dy having a purity of 99.9% and had a size of length 30 mm×width 30 mm×height 5 mm.

Next, the processing container shown in FIG. 10 was heated in a vacuum heat treatment furnace to perform heat treatment. The heat treatment was performed at a heat treatment temperature of 900° C. and a pressure of $1.0 \times 10^{-2}$ Pa for 180 minutes. The heat treatment temperature is the temperature of the rare earth sintered magnet bodies and the RH bulk bodies. After the heat treatment, the pressure was set to 2 Pa, and aging treatment was performed at 500° C. for 60 minutes. During the heat treatment, $DyH_2$ evaporated from the RH bulk bodies 54 was precipitated on the surface of each rare earth sintered magnet body 21 and diffused into the interior thereof. A rare earth sintered magnet in which $DyH_2$ had been evaporated onto the surface of the rare earth sintered magnet body 21 and diffused over the surface was thereby produced.

<Evaluation of Characteristics>

The characteristics of each of the produced rare earth sintered magnets were measured by the methods described below. The characteristics measured were the application (adhesion) amount and magnetic properties of $DyH_2$ applied to the surface of the rare earth sintered magnet body 21 of each rare earth sintered magnet. The amount of improvement in coercive force (ΔHCJ) due to application and the amount of reduction in residual magnetic flux density (ΔBr) due to application were measured as the magnetic properties. Magnetic field analyzing simulations were performed using the rare earth sintered magnet body 21 and the rare earth sintered magnets coated with $DyH_2$ by the slurry application methods in Examples 1 and 8 and Comparative Example 1 to measure cogging torque and demagnetization temperature at which demagnetization of a rare earth sintered magnet started.

[Amount of $DyH_2$ Applied]

First, the mass of the rare earth sintered magnet body 21 before the slurry 22 of $DyH_2$ was applied and the mass of the dried rare earth sintered magnet body 21 after the application of the slurry 22 were measured, and the measured masses were compared to compute the amount of $DyH_2$ applied to the sintered body. The amount of $DyH_2$ applied per unit surface area (mg/cm$^2$) of the rare earth sintered magnet body 21 was computed from the above-computed amount of $DyH_2$ applied.

The rare earth sintered magnet bodies 21 used had a flat plate shape described above. The amount of $DyH_2$ applied to each rare earth sintered magnet body 21 was measured as follows. A face of the rare earth sintered magnet body 21 that had a largest area was divided into 9 regions (first to ninth regions described below) as shown in FIG. 11, and the thickness of the film in each region was measured at around its center using a micrometer. Since the rare earth sintered magnet body 21 used has a flat plate shape, a direction parallel to the rotation axis is the lengthwise direction of the face, and a direction perpendicular to the rotation axis is the widthwise direction of the face.

First region: a region on one edge in the direction perpendicular to the rotation axis (the widthwise direction of the face) and on one edge in the direction parallel to the rotation axis (the lengthwise direction of the face)

Second region: a region adjacent to the first region in the direction parallel to the rotation axis Third region: a region on the one edge in the direction perpendicular to the rotation axis and on the other edge parallel to the rotation axis Fourth region: a region at the center in the direction perpendicular to the rotation axis and adjacent to the first region Fifth region: a region at the center in the direction perpendicular to the rotation axis and adjacent to the second region Sixth region: a region at the center in the direction perpendicular to the rotation axis and adjacent to the third region Seventh region: a region on the other edge in the direction perpendicular to the rotation axis and adjacent to the fourth region Eighth region: a region on the other edge in the direction perpendicular to the rotation axis and adjacent to the fifth region Ninth region: a region on the other edge in the direction perpendicular to the rotation axis and adjacent to the sixth region The first to third regions among the nine divided regions used for the measurement of the film thicknesses are regions on the vertically upper side during immersion, and the seventh to ninth regions are regions on the vertically lower side during immersion.

[ΔHcJ and ΔBr]

The magnetic properties (ΔHcJ and ΔBr) were measured as follows. 1 mm-square test pieces were taken from near the center of each of the first to ninth regions being the nine divided regions shown in FIG. 11. Some of the test pieces taken from each region were subjected to measurement using a pulse BH tracer to determine coercive force HcJ. Some of the test pieces were secured to acrylic rods and subjected to measurement using a vibrating sample magnetometer (VSM)

to measure its residual magnetic flux density Br. The amount of improvement in coercive force ΔHcJ and the amount of reduction in residual magnetic flux density due to application ΔBr were computed from the obtained measurement results.

The measurement results for the rare earth sintered magnets to which DyH$_2$ had been applied by the slurry applying methods in Examples 1 to 8 and Comparative Example 1 are shown in Tables 1 and 2. Table 1 shows the measured amount of DyH$_2$ applied, the measured film thicknesses, the average thereof, and the difference R between the maximum and minimum film thicknesses. Table 2 shows the amount of improvement in coercive force (ΔHcJ) due to application and the amount of reduction in residual magnetic flux density (ΔBr) due to application.

when the rotation speed is too high (Example 7), the film thickness decreases. When the rotation speed in too low (Example 8), the film thickness increases.

As can be seen from Table 2, the degree of unevenness in coercive force HcJ and the degree of unevenness in residual magnetic flux density Br on the surface of the obtained rare earth sintered magnet are smaller when the rare earth sintered magnet body 21 is rotated (Examples 1 to 8) than when the rare earth sintered magnet body 21 is not rotated (Comparative Example 1). Accordingly, it can be seen that the coercive force HcJ and the residual magnetic flux density Br can be uniform. When the rotation speed is too low (Example 8), the degree of unevenness in coercive force HcJ and the degree of unevenness in residual magnetic flux density Br on the surface of the obtained rare earth sintered magnet become large.

TABLE 1

| | AMOUNT OF DyH$_2$ APPLIED | FILM THICKNESS (μm) | | | | | | | | | AVERAGE VALUE | R |
|---|---|---|---|---|---|---|---|---|---|---|---|---|
| | | 1 | 2 | 3 | 4 | 5 | 6 | 7 | 8 | 9 | | |
| Example 1 | 5.2 | 22 | 21 | 19 | 22 | 21 | 22 | 20 | 22 | 19 | 20.9 | 4.0 |
| Example 2 | 5.0 | 22 | 20 | 23 | 19 | 20 | 17 | 22 | 22 | 17 | 20.2 | 6.0 |
| Example 3 | 5.0 | 20 | 21 | 18 | 21 | 20 | 19 | 22 | 20 | 22 | 20.3 | 4.0 |
| Example 4 | 5.1 | 20 | 18 | 20 | 23 | 21 | 21 | 22 | 18 | 21 | 20.4 | 5.0 |
| Example 5 | 4.9 | 20 | 23 | 21 | 21 | 20 | 22 | 21 | 19 | 17 | 20.4 | 5.0 |
| Example 6 | 5.1 | 21 | 22 | 19 | 22 | 21 | 21 | 17 | 21 | 19 | 20.3 | 5.0 |
| Example 7 | 3.0 | 13 | 16 | 13 | 10 | 9 | 11 | 12 | 15 | 12 | 12.3 | 7.0 |
| Example 8 | 5.1 | 21 | 22 | 12 | 24 | 18 | 22 | 24 | 23 | 17 | 20.3 | 12.0 |
| Comparative Example 1 | 5.5 | 10 | 13 | 11 | 22 | 18 | 19 | 30 | 32 | 36 | 21.2 | 26.0 |

TABLE 2

| | ΔHcJ | | | | | | | | | | |
|---|---|---|---|---|---|---|---|---|---|---|---|
| | 1 | 2 | 3 | 4 | 5 | 6 | 7 | 8 | 9 | AVERAGE VALUE | DEGREE OF UNEVENNESS R |
| Example 1 | 5.0 | 4.7 | 4.3 | 5.0 | 4.7 | 5.0 | 4.5 | 5.0 | 4.3 | 4.7 | 2% |
| Example 2 | 5.2 | 4.7 | 5.4 | 4.5 | 4.7 | 4.0 | 5.2 | 5.2 | 4.0 | 4.8 | 5% |
| Example 3 | 4.5 | 4.7 | 5.0 | 4.7 | 4.4 | 4.3 | 4.9 | 4.5 | 4.9 | 4.7 | 2% |
| Example 4 | 4.3 | 4.5 | 4.3 | 4.5 | 4.9 | 3.9 | 4.7 | 3.9 | 4.5 | 4.4 | 3% |
| Example 5 | 4.6 | 5.2 | 4.8 | 4.0 | 4.6 | 4.8 | 4.8 | 4.3 | 5.0 | 4.7 | 4% |
| Example 6 | 4.8 | 5.0 | 4.3 | 4.3 | 3.6 | 3.9 | 4.8 | 4.8 | 4.3 | 4.4 | 5% |
| Example 7 | 2.3 | 3.4 | 3.3 | 2.5 | 3.3 | 2.8 | 3.1 | 2.3 | 3.1 | 2.9 | 4% |
| Example 8 | 4.9 | 5.1 | 2.8 | 5.6 | 4.2 | 5.1 | 5.6 | 5.4 | 4.0 | 4.7 | 10% |
| Comparative Example 1 | 2.0 | 2.6 | 2.2 | 4.3 | 3.6 | 3.8 | 5.9 | 6.3 | 7.1 | 4.2 | 18% |
| Comparative Example 2 | 6.8 | 3.9 | 5.7 | 3.7 | 1.7 | 3.5 | 4.8 | 3.6 | 4.8 | 4.3 | 18% |

| | ΔBr | | | | | | | | | | |
|---|---|---|---|---|---|---|---|---|---|---|---|
| | 1 | 2 | 3 | 4 | 5 | 6 | 7 | 8 | 9 | AVERAGE VALUE | DEGREE OF UNEVENNESS R |
| Example 1 | −0.16 | −0.15 | −0.14 | −0.16 | −0.15 | −0.16 | −0.15 | −0.16 | −0.14 | −0.2 | 0.2% |
| Example 2 | −0.21 | −0.2 | −0.22 | −0.18 | −0.19 | −0.16 | −0.21 | −0.21 | −0.16 | −0.2 | 0.5% |
| Example 3 | −0.08 | −0.08 | −0.07 | −0.08 | −0.08 | −0.08 | −0.09 | −0.08 | −0.09 | −0.1 | 0.2% |
| Example 4 | −0.1 | −0.09 | −0.1 | −0.12 | −0.11 | −0.11 | −0.11 | −0.09 | −0.11 | −0.1 | 0.2% |
| Example 5 | −0.15 | −0.17 | −0.16 | −0.16 | −0.15 | −0.16 | −0.16 | −0.14 | −0.13 | −0.2 | 0.3% |
| Example 6 | −0.15 | −0.15 | −0.14 | −0.16 | −0.15 | −0.15 | −0.15 | −0.15 | −0.15 | −0.2 | 0.2% |
| Example 7 | −0.07 | −0.09 | −0.07 | −0.06 | −0.05 | −0.06 | −0.07 | −0.08 | −0.07 | −0.1 | 0.3% |
| Example 8 | −0.1 | −0.09 | −0.07 | −0.18 | −0.13 | −0.17 | −0.24 | −0.27 | −0.28 | −0.2 | 1.7% |
| Comparative Example 1 | −0.02 | −0.03 | −0.03 | −0.14 | −0.16 | −0.17 | −0.35 | −0.4 | −0.36 | −0.2 | 3.0% |
| Comparative Example 2 | −0.44 | −0.14 | −0.3 | −0.16 | −0.05 | −0.15 | −0.14 | −0.18 | −0.13 | −0.18 | 3.1% |

As can be seen from Table 1, the slurry 22 can be applied more uniformly by rotating the rare earth sintered magnet body 21 (Examples 1 to 8) than by not rotating the rare earth sintered magnet body 21 (Comparative Example 1). By setting the rotation speed appropriately (Examples 1 to 6), a suitable film thickness can be obtained. More specifically, It can be seen that when the rotation speed is set suitably (Examples 1 to 7), an appropriate coercive force HcJ and an appropriate residual magnetic flux density Br can be obtained. Therefore, in a rare earth sintered magnet obtained by applying the slurry to the rare earth sintered magnet body while the magnet body is rotated at a suitable rotation speed, the degree of unevenness in coercive force HcJ and the degree of unevenness in residual magnetic flux density Br on the surface of the magnet can be reduced.

In the rare earth sintered magnet obtained by evaporating $DyH_2$ onto the surface of the rare earth sintered magnet body 21 and diffusing the $DyH_2$ over the surface at high temperature in a high vacuum, the degree of unevenness in coercive force HcJ and the degree of unevenness in residual magnetic flux density Br on the surface of the magnet could not be reduced sufficiently (Comparative Example 2).

<Demagnetization Temperature and Cogging Torque>

Figure 12:
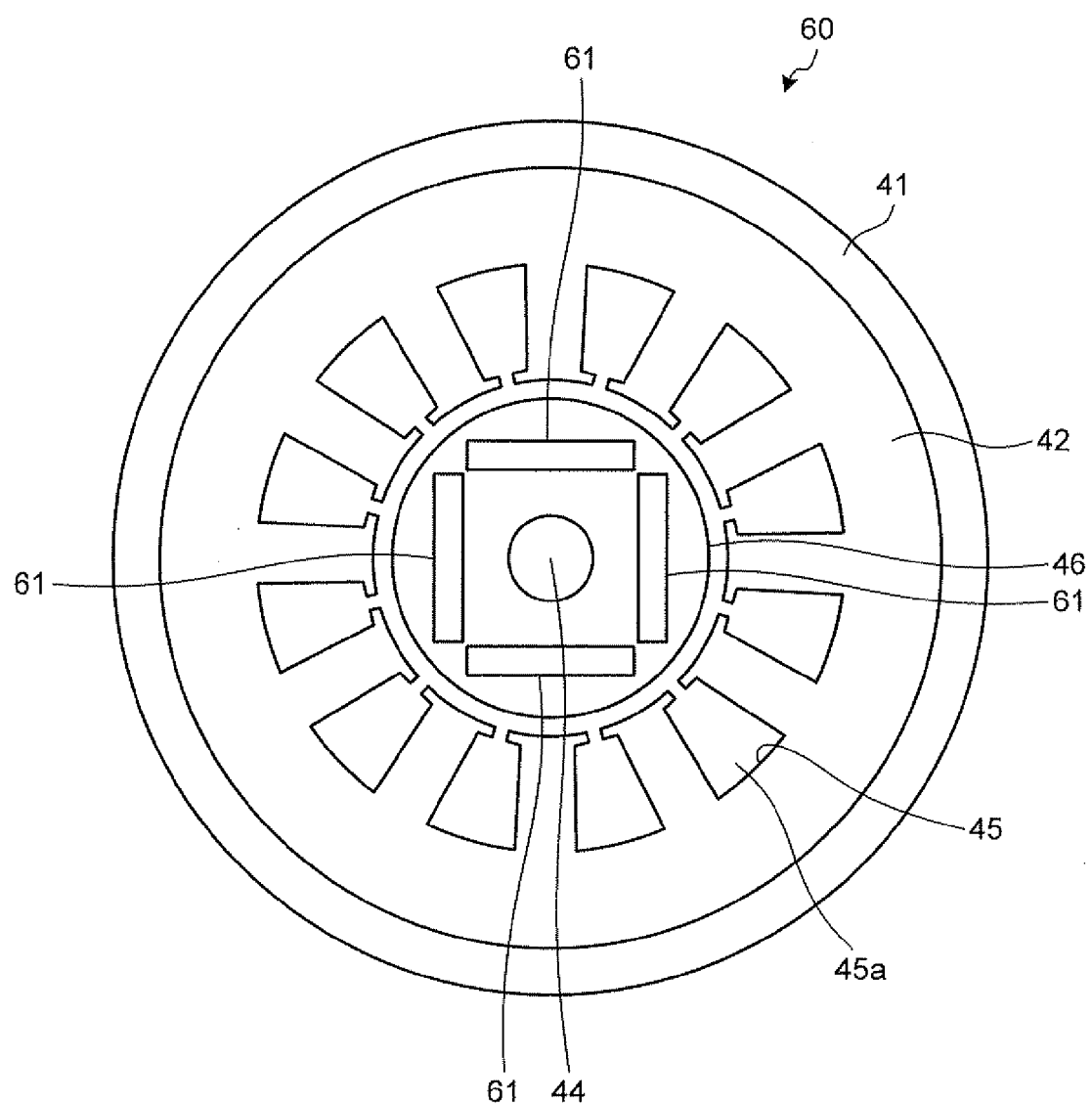
FIG. 12 is a horizontal cross-sectional view simply illustrating an example of the structure of a motor used for magnetic field analysis simulations.

Magnetic field analyzing simulations were performed using the rare earth sintered magnet body 21 (base material) before the application of the slurry 22 and the rare earth sintered magnets used in Examples 1 and 8 and Comparative Example 1 to measure demagnetization temperature and cogging torque. In the magnetic field analysis simulations, an IPM motor was used as the motor 40 shown in FIGS. 8 and 9 instead of an SPM motor. The rare earth sintered magnet body 21 (base material) before the application of the slurry 22 or one of the rare earth sintered magnets used in Examples 1 and 8 and Comparative Example 1 was used as each of permanent magnets for the IPM motor. The same components as those of the motor 40 shown in FIGS. 8 and 9 are denoted by the same reference numerals, and redundant description will be omitted. FIG. 12 is a horizontal cross-sectional view simply illustrating an example of the structure of the motor used for the magnetic field analysis simulations. As shown in FIG. 12, the a motor 60 includes permanent magnets 61 disposed inside the rotor core 46. The base material or one of the rare earth sintered magnets used in Examples 1 and 8 and Comparative Example 1 was used as each permanent magnet 61. After the permanent magnets 61 were disposed inside the rotor core 46, a magnetic field was applied to perform the magnetic field analysis simulations. The demagnetization temperature and cogging torque of the base material and the demagnetization temperature and cogging torque of each of the rare earth sintered magnets used in Examples 1 and 8 and Comparative Example 1 are shown in Table 3. In the values of cogging torque in Table 3, the amplitude of the rare earth sintered magnet body 21 before the application of the slurry 22 was set to 1.

TABLE 3

|  | UNEVEN-NESS IN HcJ | UNEVEN-NESS IN Br | DEMAGNETI-ZATION TEMPERA-TURE | COGGING TORQUE |
|---|---|---|---|---|
| BASE MATERIAL | 0% | 0.0% | 160 | 1 |
| EXAMPLE 1 | 2% | 0.2% | 200 | 1 |
| EXAMPLE 8 | 10% | 1.7% | 190 | 1.5 |
| COMPARATIVE EXAMPLE 1 | 18% | 3.0% | 170 | 2.5 |

As can be seen from Table 3, by applying the slurry 22 to the rare earth sintered magnet body 21 while the rare earth sintered magnet body 21 is rotated (Examples 1 and 8), the demagnetization temperature can be increased and the cogging torque can be reduced as compared to those when the slurry 22 is applied to the rare earth sintered magnet body 21 while the rare earth sintered magnet body 21 is not rotated (Comparative Example 1). When the rotation speed is too low (Example 8), unevenness in coercive force HcJ, residual magnetic flux density Br, etc. increases, and this causes a reduction in demagnetization temperature and an increase in cogging torque. However, it can be seen that by setting the rotation speed appropriately (Example 1), the demagnetization temperature can be increased, and the cogging torque can be reduced. Therefore, in a rare earth sintered magnet obtained by applying the slurry to the rare earth sintered magnet body while the magnet body is rotated at a suitable rotation speed, the demagnetization temperature increases, and the cogging torque decreases. The use of such a rare earth sintered magnet as a permanent magnet for a motor can improve the performance of the motor such as its torque characteristics. Therefore, a rare earth sintered magnet obtained by applying the slurry to the rare earth sintered magnet body while the magnet body is rotated at a suitable rotation speed can be preferably used as a permanent magnet for a motor.

REFERENCE SIGNS LIST 10 magnet producing apparatus
11 sintered body preparation mechanism
12 application mechanism
13 drying mechanism
14 heat treatment mechanism
15 conveyance mechanism
16 control mechanism
21 rare earth sintered magnet body
22 slurry
23 application means
24 rotating-holding means
25 spray head
26 nozzle
27 slurry collecting unit
28 contact section
29 rotating section
30 mounting section
31 slurry circulating unit
32a, 32b, 37 pipe
33 slurry tank
34 concentration adjusting unit
35 solvent tank
36 pump
38 slurry bath
39 nozzle
40 motor
41 housing
42 stator
43 rotor
44 rotation shaft
45 slot
45a coil
46 rotor core
47, 61 permanent magnet

The invention claimed is:

1. A rare earth sintered magnet comprising a rare earth sintered magnet body including crystal grains of $(R1, R2)_2T_{14}B$;

wherein:
R1 represents at least one rare earth element except for Dy and Tb,
R2 represents a rare earth element at least including one or both of Dy and Tb,
T represents one or more transition metal elements including Fe or including Fe and Co, a ratio of R2 to a sum of R1 and R2 that is contained in crystal grain boundaries surrounding the crystal grains in the rare earth sintered magnet body is higher than a ratio of R2 to a sum of R1 and R2 in the crystal grains, a concentration of R2 increases from a central portion of the rare earth sintered magnet body toward a surface of the rare earth sintered magnet body; and a degree of unevenness in residual magnetic flux density among a plurality of areas on the surface of the rare earth sintered magnet body is smaller than 3.0%.

2. The rare earth sintered magnet according to claim 1, wherein a degree of unevenness in coercive force among a plurality of areas on the surface of the rare earth sintered magnet body is smaller than 18.0%.

3. The rare earth sintered magnet according to claim 1, wherein the rare earth sintered magnet body has a plurality of faces, and among the plurality of faces of the rare earth sintered magnet body, a face on which the degree of unevenness in residual magnetic flux density is minimum is perpendicular to an alignment direction of the rare earth sintered magnet body.

4. A rare earth sintered magnet obtained by:

rotating a rare earth sintered magnet body including crystal grains of $(R1, R2)_2T_{14}B$, applying a slurry containing a compound of the rare earth element R2 to the rare earth sintered magnet body, drying the slurry while the rare earth sintered magnet body is rotated, and subjecting the rare earth sintered magnet body including the dried slurry to heat treatment, wherein:

R1 represents at least one rare earth element except for Dy and Tb,

R2 represents a rare earth element at least including one or both of Dy and Tb,

T represents one or more transition metal elements including Fe or including Fe and Co, a ratio of R2 to a sum of R1 and R2 that is contained in crystal grain boundaries surrounding the crystal grains in the rare earth sintered magnet body is higher than a ratio of R2 to a sum of R1 and R2 in the crystal grains, a concentration of R2 increases from a central portion of the rare earth sintered magnet body toward a surface of the rare earth sintered magnet body; and a degree of unevenness in residual magnetic flux density among a plurality of areas on the surface of the rare earth sintered magnet body is smaller than 3.0%.

5. The rare earth sintered magnet according to claim 4, wherein the slurry is sprayed onto the rare earth sintered magnet body to be applied to the rare earth sintered magnet body.

6. The rare earth sintered magnet according to claim 4, wherein the rare earth sintered magnet body is immersed in a region in which the slurry is stored to thereby apply the slurry to the rare earth sintered magnet body.

7. The rare earth sintered magnet according to claim 4, wherein the slurry is applied as a plurality of slurry streams to the rare earth sintered magnet body.

8. The rare earth sintered magnet according to claim 4, wherein the slurry is dropped from a position vertically above a placement position of the rare earth sintered magnet body to be applied to the rare earth sintered magnet body.

9. A motor comprising a stator including a plurality of coils arranged circumferentially, and a rotor disposed rotatably in the stator and including rare earth sintered magnets according to claim 1, the rare earth sintered magnets being disposed on an outer circumferential surface of the rotor at predetermined intervals.

* * * * *